(12) United States Patent
Jung et al.

(10) Patent No.: US 12,362,793 B2
(45) Date of Patent: Jul. 15, 2025

(54) APPARATUS AND METHOD FOR CHANNEL BONDING-BASED MULTI-ANTENNA SIGNAL TRANSMISSION IN BROADCASTING SYSTEM

(71) Applicant: ELECTRONICS AND TELECOMMUNICATIONS RESEARCH INSTITUTE, Daejeon (KR)

(72) Inventors: Hoi-Yoon Jung, Sejong-si (KR); Sung-Ik Park, Daejeon (KR); Jae-Hyun Seo, Daejeon (KR); Bo-Mi Lim, Daejeon (KR); Dong-Joon Choi, Daejeon (KR); Nam-Ho Hur, Sejong-si (KR); Jeong-Chang Kim, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 204 days.

(21) Appl. No.: 18/176,556

(22) Filed: Mar. 1, 2023

(65) Prior Publication Data

US 2023/0283333 A1  Sep. 7, 2023

(30) Foreign Application Priority Data

Mar. 3, 2022  (KR) .................. 10-2022-0027724
Mar. 3, 2022  (KR) .................. 10-2022-0027726
(Continued)

(51) Int. Cl.
*H04B 7/0456*  (2017.01)
*H04L 1/00*  (2006.01)

(52) U.S. Cl.
CPC ......... *H04B 7/0469* (2013.01); *H04L 1/0071* (2013.01)

(58) Field of Classification Search
CPC ... H04B 7/0413; H04B 7/0469; H04L 1/0071; H04L 1/0041; H04L 25/14; H04L 1/0057
See application file for complete search history.

(56) References Cited

U.S. PATENT DOCUMENTS 10,454,536 B2  10/2019  Park et al.
11,115,255 B2   9/2021  Zoellner et al.
(Continued)

FOREIGN PATENT DOCUMENTS

JP   2018-503298 A    2/2018
KR  10-2018-0132525 A  12/2018
(Continued)

OTHER PUBLICATIONS

Gómez-Barquero et al ("MIMO for ATSC 3.0", IEEE Transactions on Broadcasting, vol. 62, No. 1, Mar. 2016 (Year: 2016).*
(Continued)

*Primary Examiner* — Aristocratis Fotakis
(74) *Attorney, Agent, or Firm* — Rabin & Berdo, P.C.

(57) ABSTRACT

Disclosed herein are an apparatus and method for channel bonding-based multi-antenna signal transmission in a broadcasting system. An apparatus for channel bonding-based multi-antenna signal transmission includes an input formatting unit for converting input data into a Physical Layer Pipe (PLP), a stream partitioning unit for partitioning the PLP into pieces of data to be transmitted to two or more channels, respectively, and two or more transmission units for transmitting the pieces of data resulting from partitioning to corresponding channels through multiple antennas.

14 Claims, 8 Drawing Sheets

(30) Foreign Application Priority Data

Oct. 14, 2022 (KR) ........................ 10-2022-0132482
Feb. 6, 2023 (KR) ........................ 10-2023-0015452

(56) References Cited

U.S. PATENT DOCUMENTS

| | | |
|---|---|---|
| 11,153,849 B2 | 10/2021 | Lee et al. |
| 2016/0164800 A1 | 6/2016 | Eitan et al. |
| 2017/0019207 A1* | 1/2017 | Park .................... H04L 27/3488 |
| 2017/0366381 A1* | 12/2017 | Zoellner ................ H04L 5/001 |
| 2018/0351609 A1* | 12/2018 | Park ................... H04L 25/03343 |
| 2021/0144040 A1 | 5/2021 | Lee et al. |
| 2021/0367821 A1* | 11/2021 | Park ..................... H04L 5/0075 |

FOREIGN PATENT DOCUMENTS

| | | |
|---|---|---|
| KR | 10-2020-0025136 A | 3/2020 |
| KR | 10-2020-0045409 A | 5/2020 |

OTHER PUBLICATIONS

Lim et al ("Overview of Channel Bonding and MIMO of ATSC 3.0 Broadcasting System", Set Expo Proceedings 8, Jan. 2022 (Year: 2022).*

Nguyen et al ("Capacity Improvement for DVB-NGH with Dual-Polarized MIMO Spatial Multiplexing and Hybrid Beamforming", Hindawi, International Journal of Digital Multimedia Broadcasting, Aug. 17, 2020 (Year: 2020).*

Ahn et al ("ATSC 3.0 for Future Broadcasting: Features and Extensibility", Set International Journal of Broadcast Engineering, 2020 (Year: 2020).*

Lachlan Michael and David Gómez-Barquero, Bit-Interleaved Coded Modulation (BICM) for ATSC 3.0, IEEE Transactions on Broadcasting, Jan. 2016 (Year: 2016).*

Advanced Television Systems Committee, "ATSC Standard: Physical Layer Protocol", A/322, Jan. 20, 2021.

* cited by examiner

APPARATUS AND METHOD FOR CHANNEL BONDING-BASED MULTI-ANTENNA SIGNAL TRANSMISSION IN BROADCASTING SYSTEM

CROSS REFERENCE TO RELATED APPLICATIONS

This application claims the benefit of Korean Patent Application Nos. 10-2022-0027724, filed Mar. 3, 2022, 10-2022-0027726, filed Mar. 3, 2022, 10-2022-0132482, filed Oct. 14, 2022, and 10-2023-0015452, filed Feb. 6, 2023, which are hereby incorporated by reference in their entireties into this application.

BACKGROUND OF THE INVENTION

1. Technical Field

The following embodiments relate generally to a multi-antenna signal transmission method using channel bonding in a broadcasting system, and more particularly to signal transmission technology that supports both channel bonding and multi-antenna transmission.

2. Description of the Related Art

By a demand for an Ultra-High-Definition (UHD) broadcasting service, next-generation terrestrial broadcasting system standards for providing UHD broadcasting have appeared. In addition, with a requirement for further enhanced broadcasting service such as 8K UHD broadcasting service, and the appearance of television (TV) supporting 8K resolution, the improvement of the transfer rate of a terrestrial broadcasting system is required.

In order to improve the transfer rate in a terrestrial broadcasting system, channel bonding technology using multiple channels and multi-antenna technology using multiple transmitting/receiving antennas may be taken into consideration.

In order to maximize the transfer rate of the terrestrial broadcasting system, the introduction of a transmission scheme that supports both channel bonding technology and multi-antenna transmission technology is required.

For this, to support both channel bonding technology and multi-antenna transmission technology, a transmission structure therefor is required.

Furthermore, cross channel bonding may allow additional improvement of the transfer rate to be expected by means of an additional diversity gain. In order to support both cross channel bonding technology and multi-antenna transmission technology, a transmission structure therefor is required.

SUMMARY OF THE INVENTION

An embodiment is intended to provide a transmission scheme that supports both channel bonding technology and multi-antenna transmission technology so as to maximize the transfer rate of a terrestrial broadcasting system.

An embodiment is intended to provide a transmission scheme that supports both cross channel bonding technology and multi-antenna transmission technology so as to maximize the transfer rate of a terrestrial broadcasting system.

In accordance with an aspect of the present disclosure, there is provided an apparatus for channel bonding-based multi-antenna signal transmission, including an input formatting unit for converting input data into a Physical Layer Pipe (PLP), a stream partitioning unit for partitioning the PLP into pieces of data to be transmitted to two or more channels, respectively, and two or more transmission units for transmitting the pieces of data resulting from partitioning to corresponding channels through multiple transmitting antennas.

Each of the transmission units may include a Bit-Interleaved and Coded Modulation (BICM) unit for dividing the pieces of data resulting from partitioning into data cells to be transmitted through multiple transmitting antennas, respectively, and outputting the data cells, a Multiple-Input Multiple-Output (MIMO) precoder for performing stream combining, In phase and Quadrature (IQ) polarization interleaving, and phase hopping on each of the data cells and outputting results thereof, and framing and interleaving units and waveform generation units respectively corresponding to the multiple transmitting antennas.

The BICM unit may include a Forward Error Correction (FEC) for generating an FEC frame using a baseband packet, a Bit Interleaver (BIL) for performing bit interleaving on the generated FEC frame, and a MIMO mapper for dividing bit-interleaved data into data cells to be transmitted through respective multiple transmitting antennas, and the MIMO mapper may include a demultiplexer for dividing a bitstream into data cells, and a bit-to-In phase and Quadrature (IQ) mapping unit for performing constellation mapping on each data cell generated by the demultiplexer, and the Bit-to-IQ mapping unit may be configured to, when an index of the corresponding data cell is an even number, map the data cell to a first transmitting antenna, and when an index of the data cell is an odd number, map the data cell to a second transmitting antenna.

The MIMO precoder may include a stream combining unit, an IQ polarization interleaving unit, and a phase hopping unit, which are individually activated or deactivated.

The apparatus may further include N cell exchange units for crossing pieces of data that correspond to N-th transmitting antennas and are output from respective BICM units between channels, and outputting pieces of crossed data to respective MIMO precoders.

The cell exchange units may be individually activated or deactivated using different parameters, or may be collectively activated or deactivated using an identical parameter.

Each of the MIMO precoders may include a stream combining unit, an IQ polarization interleaving unit, and a phase hopping unit, which are configured to, when the cell exchange units are activated, be operated equally for respective channels, and when the cell exchange units are deactivated, be operated independently for respective channels.

The framing and interleaving units and the waveform generation units may be configured to, when the cell exchange units are activated, perform framing operations for multiple transmitting antennas corresponding to each channel by using an identical parameter for the corresponding channel, and when the cell exchange units are deactivated, perform framing operations for N-th transmitting antennas corresponding to respective channels by using different parameters.

Each of the transmission units may include a BICM unit for performing bit-interleaved and code modulation on the pieces of data resulting from partitioning and outputting results thereof, a MIMO mapper for dividing pieces of bit data resulting from partitioning into data cells to be transmitted through multiple transmitting antennas, respectively, and outputting the data cells, a Multiple-Input Multiple-Output (MIMO) precoder for performing stream combining, IQ polarization interleaving, and phase hopping on each of the data cells resulting from partitioning and outputting results thereof, and framing and interleaving units and waveform generation units respectively corresponding to the multiple transmitting antennas, and the apparatus may further include a cell exchange unit for crossing and outputting pieces of data output from the BICM units of the transmission units between channels, cell-to-bit converters for converting pieces of data for respective channels output from the cell exchange unit into bits and outputting the bits to corresponding MIMO precoders.

The cell exchange unit may be activated or deactivated depending on a channel-bonding mode, and is configured to, when the cell exchange unit is activated, cross the pieces of data between the channels depending on whether an index of each data cell is an odd number or an even number.

The MIMO precoder may include a stream combining unit, an IQ polarization interleaving unit, and a phase hopping unit, which are configured to, when the cell exchange unit is activated, be operated equally for respective channels, and when the cell exchange unit is deactivated, be operated independently for respective channels.

The framing and interleaving units and the waveform generation units may be configured to, when the cell exchange unit is activated, perform framing operations for multiple transmitting antennas corresponding to each channel by using an identical parameter for the corresponding channel, and when the cell exchange unit is deactivated, perform framing operations for N-th transmitting antennas corresponding to respective channels by using different parameters.

In accordance with another aspect of the present disclosure, there is provided an apparatus for channel bonding-based multi-antenna signal transmission in a broadcasting system, including an input formatting unit for converting input data into a Physical Layer Pipe (PLP), a stream partitioning unit for partitioning the PLP into pieces of data to be transmitted to two or more channels, respectively, a first transmission unit for transmitting the pieces of data resulting from partitioning to a first channel through a single-transmitting antenna, and a second transmission unit for transmitting the pieces of data resulting from partitioning to a second channel through multiple transmitting antennas.

The first transmission unit may include a first BICM unit for dividing the pieces of data resulting from partitioning into data cells to be transmitted through the single-transmitting antenna and outputting the data cells, and a framing and interleaving unit and a waveform generation unit corresponding to the single-transmitting antenna, wherein the first BICM unit may include a Forward Error Correction (FEC) unit for generating an FEC frame using a baseband packet, a Bit Interleaver (BIL) for performing bit interleaving on the generated FEC frame, and a mapper for performing constellation mapping on the data cells to be transmitted through the single-transmitting antenna and outputting results thereof.

The second transmission unit may include a second Bit-Interleaved and Coded Modulation (BICM) unit for dividing the pieces of data resulting from partitioning into data cells to be transmitted through the multiple transmitting antennas, respectively, and outputting the data cells, a MIMO precoder for performing stream combining, IQ polarization interleaving, and phase hopping on each of the data cells, and outputting results thereof, and framing and interleaving units and waveform generation units respectively corresponding to multiple transmitting antennas, wherein the second BICM unit may include a Forward Error Correction (FEC) unit for generating an FEC frame using a baseband packet, a Bit Interleaver (BIL) for performing bit interleaving on the generated FEC frame, and a MIMO mapper for dividing bit-interleaved data into data cells to be transmitted through respective multiple transmitting antennas.

In accordance with a further aspect of the present disclosure, there is provided a method for channel bonding-based multi-antenna signal transmission in a broadcasting system, including an input formatting operation of converting input data into a Physical Layer Pipe (PLP), a stream partitioning operation of partitioning the PLP into pieces of data to be transmitted through two or more channels, respectively, and an operation of transmission units for transmitting the pieces of data resulting from partitioning to corresponding channels through one or more transmitting antennas.

The transmitting operation may include dividing the pieces of data resulting from partitioning into data cells to be transmitted through two or more transmitting antennas, performing MIMO precoding on each of the data cells, performing framing and interleaving operations respectively corresponding to the two or more transmitting antennas, and generating waveforms to be transmitted, wherein the transmitting operation is performed for each of two or more channels.

The transmitting operation may include, for a first channel, dividing the pieces of data resulting from partitioning into data cells to be transmitted through two or more transmitting antennas, respectively, performing MIMO precoding on each of the data cells, performing framing and interleaving operations respectively corresponding to the two or more transmitting antennas, and generating waveforms to be transmitted, and the transmitting operation may include, for a second channel, dividing the pieces of data resulting from partitioning into data cells to be transmitted through a single-transmitting antenna, performing a framing and interleaving operation corresponding to the single-transmitting antenna, and generating a waveform to be transmitted.

The transmitting operation may further include crossing the pieces of data to be transmitted to respective channels between channels.

The transmitting operation may include dividing the pieces of data resulting from partitioning into data cells to be transmitted through multiple transmitting antennas, respectively, crossing data cells corresponding to N-th transmitting antennas for respective channels between channels, performing MIMO precoding on each of the crossed data cells, performing framing and interleaving operations respectively corresponding to multiple transmitting antennas, and generating waveforms to be transmitted, wherein the crossing is performed multiple times for respective sequence numbers of the transmitting antennas.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
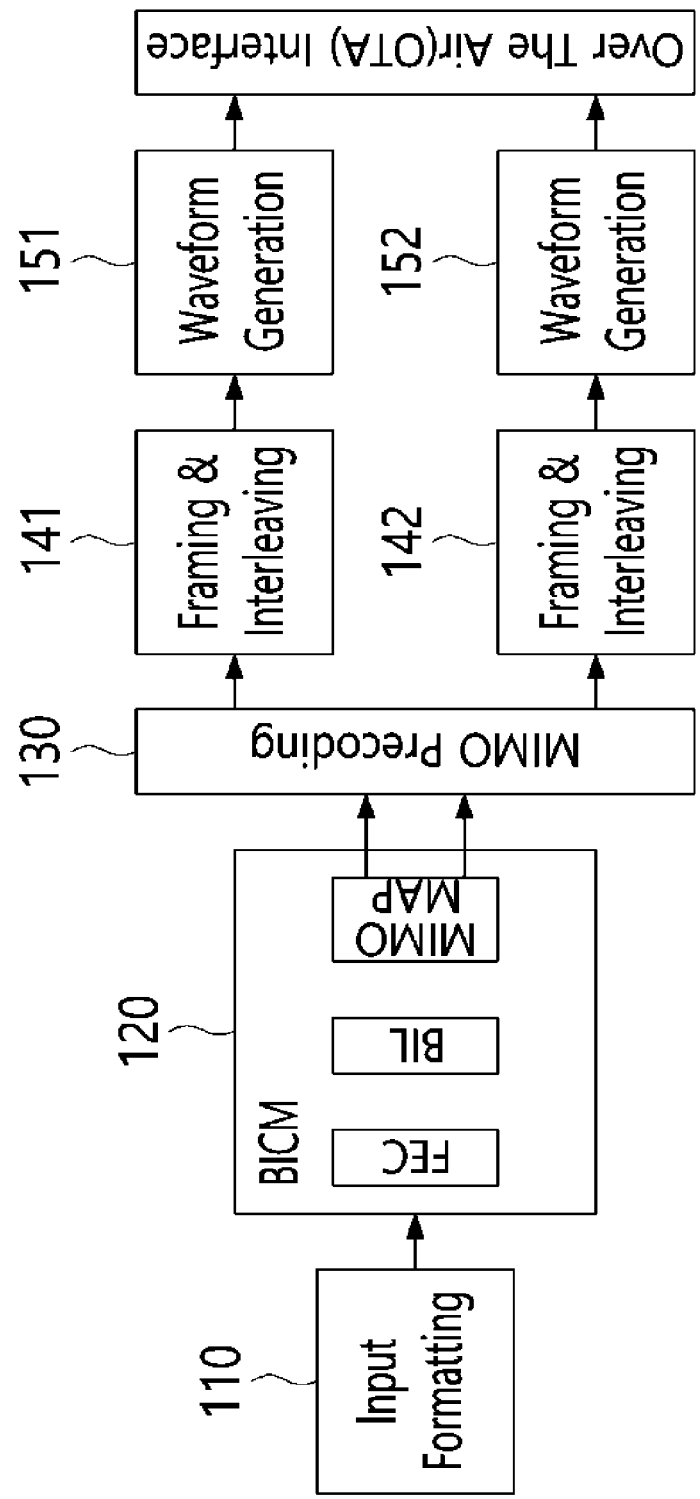
FIG. 1 is a schematic block configuration diagram of a transmission apparatus using multiple antennas in a broadcasting system.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, an apparatus and method for channel bonding-based multi-antenna signal transmission in a broadcasting system according to embodiments will be described in detail with reference to FIGS. 1 to 8.

FIG. 1 is a schematic block configuration diagram of a transmission apparatus using multiple antennas in a broadcasting system.

Referring to FIG. 1, an input formatting unit 110 may convert input data into a Physical Layer Pipe (PLP) and output the PLP to a Bit-Interleaved and Coded Modulation (BICM) unit 120.

The BICM unit 120 may be composed of a Forward Error Correction (FEC) unit, a Bit Interleaver (BIL), and a Multiple-Input Multiple Output Mapper (MIMO MAP).

Here, the FEC unit generates an FEC frame using a baseband packet. The bit interleaver (BIL) performs bit interleaving on the FEC frame generated by the FEC unit. The MIMO mapper includes a demultiplexer and a bit-to-In phase and Quadrature (IQ) mapping unit.

The demultiplexer may divide a bitstream into data cells. Here, the number of output data cells may vary depending on a modulation/demodulation order.

The bit-to-IQ mapping unit performs constellation mapping on the data cells generated by the demultiplexer. Here, when the index of the corresponding data cell is an even number, the data cell is mapped to transmitting antenna 1, whereas when the index of the corresponding data cell is an odd number, the data cell is mapped to transmitting antenna 2.

Results divided into the data cell for transmitting antenna 1 and the data cell for transmitting antenna 2 are input to a MIMO precoder 130.

The MIMO precoder 130 is composed of three detailed components such as a stream combining unit, an IQ polarization interleaving unit, and a phase hopping unit. Here, respective detailed components of the MIMO precoder 130 may be separately set to be activated/deactivated.

The outputs of the MIMO precoder 130 undergo framing & interleaving units 141 and 142 and waveform generation units 151 and 152 with respect to pieces of data for transmitting antenna 1 and transmitting antenna 2, respectively.

Here, framing may include configuration of a preamble and configuration of subframe components. Interleaving may include interleaving in a time domain or a frequency domain.

Each of the waveform generation units 151 and 152 may perform a pilot insertion function, a Multiple-Input Single-Output (MISO) function, an Inverse Fast Fourier Transform (IFFT) function, a Guard Interval (GI) insertion function, and a bootstrap insertion function. Signals going through the wave generation units may be transmitted through respective antennas.

The framing & interleaving units 141 and 142 and the waveform generation units 151 and 152 may be separately configured for antenna 1 and antenna 2.

Figure 2:
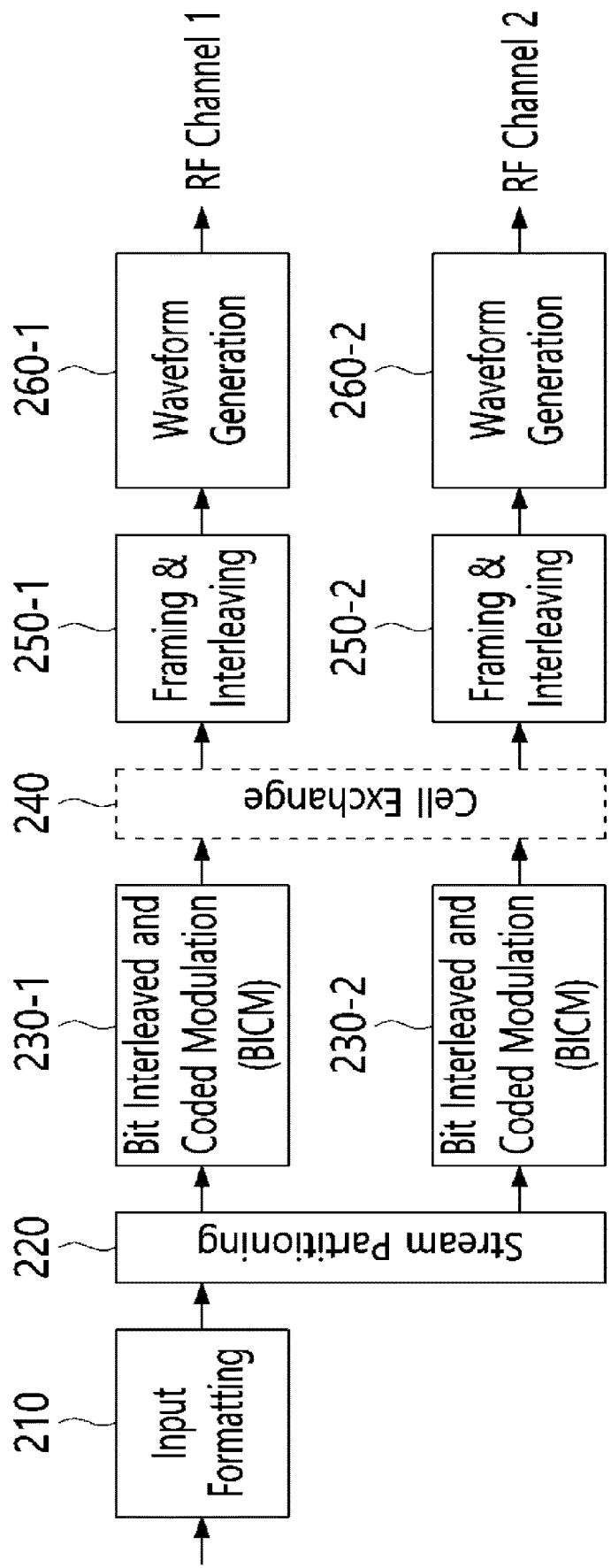
FIG. 2 is a schematic block diagram of a transmission apparatus using channel bonding in a broadcasting system.

FIG. 2 is a schematic block diagram of a transmission apparatus using channel bonding in a broadcasting system.

Referring to FIG. 2, data is converted into a Physical Layer Pipe (PLP) through an input formatting unit 210. The converted PLP is input to a stream partitioning unit 220.

The stream partitioning unit 220 partitions the PLP into pieces of data to be transmitted to Radio Frequency (RF) channel 1 and RF channel 2. The pieces of data resulting from the partitioning may be input to BICM units 230-1 and 230-2 for RF channels respectively corresponding thereto.

Each of the BICM units 230-1 and 230-2 is composed of three detailed components such as an FEC unit, a BIL, and a mapper. That is, the three detailed components may be implemented as a Forward Error Correction (FEC) unit, a Bit Interleaver (BIL), and a mapper.

Here, the FEC unit generates an FEC frame using a baseband packet. The bit interleaver (BIL) performs bit interleaving on the FEC frame generated by the FEC unit.

The mapper includes a demultiplexer and a bit-to-In phase and Quadrature (IQ) mapping unit.

The demultiplexer functions to divide a bitstream into data cells. Here, the number of output data cells may vary depending on a modulation/demodulation order.

Constellation mapping is performed on the data cells, generated by the demultiplexer, through the bit-to-IQ mapping unit.

Pieces of data going through the BICM units 230-1 and 230-2 are input to a cell exchange unit 240.

The cell exchange unit 240 may be activated/deactivated depending on a channel bonding mode.

Here, when the cell exchange unit 240 is deactivated, the input and output of the cell exchange unit 240 may be identical to each other. When the cell exchange unit 240 is activated, pieces of data of RF channel 1 and RF channel 2 may cross each other depending on the index of each data cell.

In an embodiment, when the index of the corresponding data cell is an even number, the configuration and transmission of a transmission signal using the transmission path of RF channel 1 may be performed on data scheduled to be transmitted to RF channel 1.

Similarly, the configuration and transmission of a transmission signal using the transmission path of RF channel 2 may be performed on data scheduled to be transmitted to RF channel 2.

For example, input data and output data of the cell exchange unit 240 may be identical to each other.

In an embodiment, when the index of the corresponding data cell is an odd number, the configuration and transmission of a transmission signal using the transmission path of RF channel 2 may be performed on data scheduled to be transmitted through RF channel 1.

Similarly, the configuration and transmission of a transmission signal using the transmission path of RF channel 1 may be performed on data scheduled to be transmitted to RF channel 2.

For example, the RF channel numbers of the input data and the output data of the cell exchange unit 240 may be changed to each other.

Pieces of data going through the cell exchange unit 240 undergo framing & interleaving units 250-1 and 250-2 and waveform generation units 260-1 and 260-2 for RF channel 1 and RF channel 2, respectively.

Framing may configure a preamble and a subframe. Interleaving may include interleaving in a time domain or a frequency domain.

Each of the waveform generation units 260-1 and 260-2 may perform a pilot insertion function, a Multiple-Input Single-Output (MISO) function, an Inverse Fast Fourier Transform (IFFT) function, a Guard Interval (GI) insertion function, and a bootstrap insertion function.

Signals going through the waveform generation units 260-1 and 260-2 may be transmitted through respective channels.

The framing & interleaving units 250-1 and 250-1 and the waveform generation units 260-1 and 260-2 may be respectively present for RF channel 1 and RF channel 2.

The described embodiments may provide various embodiments of a transmission scheme that supports both channel bonding technology and multi-antenna transmission technology so as to maximize the transfer rate of a terrestrial broadcasting system.

In a first embodiment, the pieces of data resulting from the partitioning may be transmitted to the corresponding channels through multiple antennas.

In a second embodiment, the pieces of data resulting from the partitioning may be transmitted to the corresponding first channel through a single antenna, and may be transmitted to the corresponding second channel through multiple antennas.

In third to fifth embodiments, the pieces of data resulting from the partitioning may be transmitted to the corresponding channels through multiple antennas so that the pieces of data cross each other between the channels.

Figure 3:
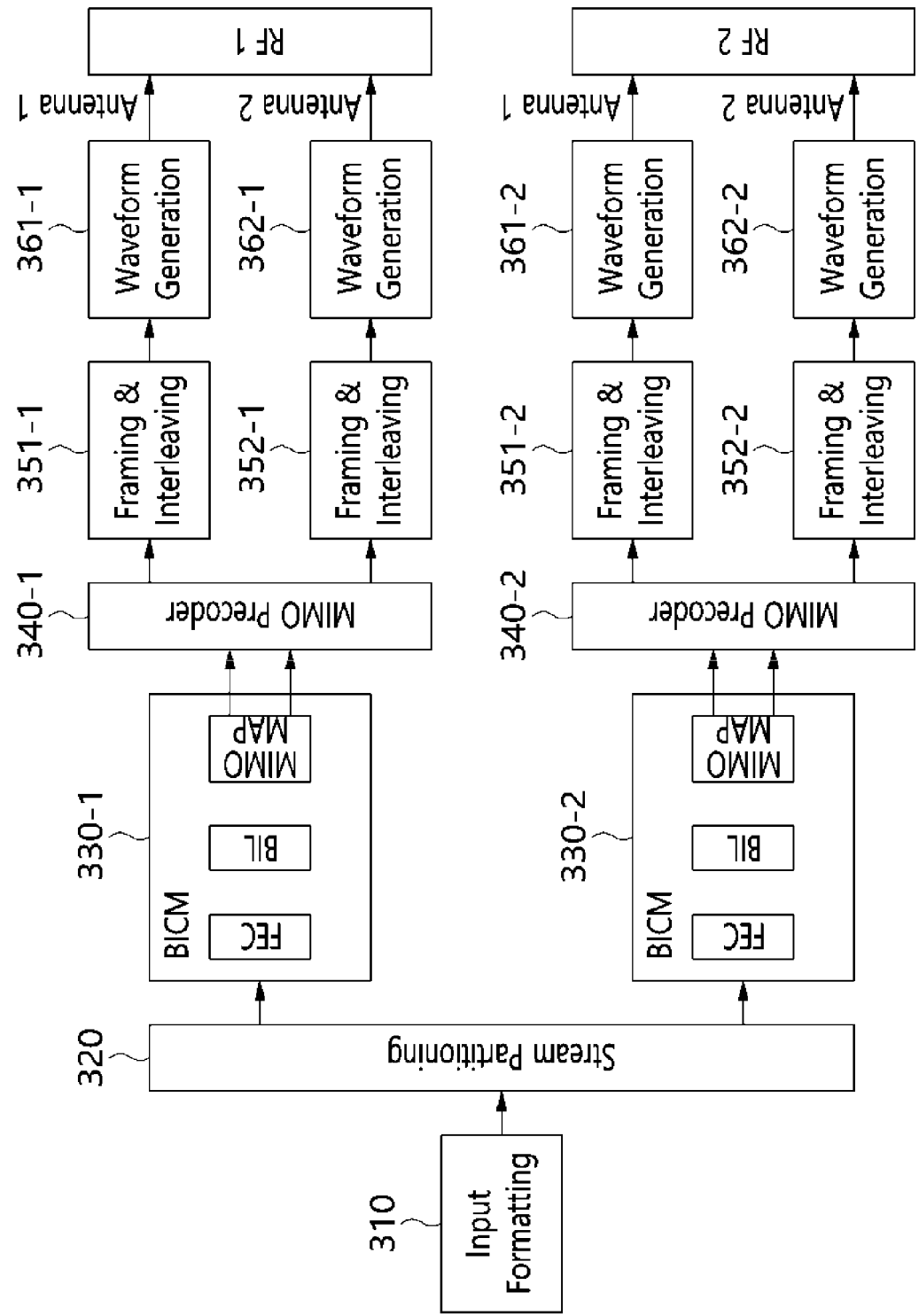
FIG. 3 is a block configuration diagram of an apparatus for channel bonding-based multi-antenna signal transmission in a broadcasting system according to a first embodiment of the present disclosure.

FIG. 3 is a block configuration diagram of an apparatus for channel bonding-based multi-antenna signal transmission in a broadcasting system according to a first embodiment of the present disclosure.

Referring to FIG. 3, data is converted into a Physical Layer Pipe (PLP) through an input formatting unit 310. The converted PLP is input to a stream partitioning unit 320.

The stream partitioning unit 320 may partition the PLP into pieces of data to be transmitted to two or more RF channels, respectively.

In an embodiment, as illustrated in FIG. 3, the stream partitioning unit 320 may function to separate pieces of data to be transmitted to RF channel 1 and to RF channel 2.

The stream partitioning unit 320 may distribute the pieces of data depending on the amounts of data to be transmitted through RF channel 1 and RF channel 2. The pieces of data that are divided and input to respective transmission units for two or more RF channels are individually input to respective BICM units 330-1 and 330-2.

Each of the BICM units 330-1 and 330-2 may be composed of a Forward Error Correction (FEC) unit, a Bit Interleaver (BIL), and a Multiple-Input Multiple Output Mapper (MIMO MAP).

Here, the FEC unit generates an FEC frame using a baseband packet. The bit interleaver (BIL) performs bit interleaving on the FEC frame generated by the FEC unit. The MIMO mapper (MIMO MAP) includes a demultiplexer and a bit-to-In phase and Quadrature (IQ) mapping unit.

The demultiplexer functions to divide a bitstream into data cells. Here, the number of output data cells may vary depending on a modulation/demodulation order. Different modulation/demodulation orders may be assigned to a transmission unit corresponding to RF channel 1 and to a transmission unit corresponding to RF channel 2.

Here, when different modulation/demodulation orders are assigned, the numbers of output data cells of the demultiplexers in the MIMO mappers may be different from each other between RF channel 1 and RF channel 2.

The bit-to-IQ mapping unit performs constellation mapping on the data cells generated by the corresponding demultiplexer. Here, when the index of the corresponding data cell is an even number, the data cell is mapped to transmitting antenna 1, whereas when the index of the corresponding data cell is an odd number, the data cell is mapped to transmitting antenna 2.

Results divided into the data cell for transmitting antenna 1 and the data cell for transmitting antenna 2 are input to MIMO precoders 340-1 and 340-2.

Each of the MIMO precoders 340-1 and 340-2 includes three detailed components such as a stream combining unit, an IQ polarization interleaving unit, and a phase hopping unit. The detailed components of each of the MIMO precoders 340-1 and 340-2 may be individually activated/deactivated.

In an embodiment, the operation of the MIMO precoder 340-1 for RF channel 1 and the operation of the MIMO precoder 340-2 for RF channel 2 may be independently activated or deactivated.

In an embodiment, activation/deactivation of the stream combining unit for RF channel 1 and activation/deactivation of the stream combining unit for RF channel 2 may be independently performed.

In an embodiment, the operation of the stream combining unit for RF channel 1 may be determined depending on the modulation/demodulation order and the code rate used for RF channel 1. Further, the operation of the stream combining unit for RF channel 2 may be determined depending on the modulation/demodulation order and the code rate used for RF channel 2.

In an embodiment, activation/deactivation of the IQ polarization interleaving unit for RF channel 1 and activation/deactivation of the IQ polarization interleaving unit for RF channel 2 may be independently performed.

In an embodiment, activation/deactivation of the phase hopping unit for RF channel 1 and activation/deactivation of the phase hopping unit for RF channel 2 may be independently performed.

In an embodiment, the operation of the MIMO precoder 340-1 for RF channel 1 and the operation of the MIMO precoder 340-2 for RF channel 2 may be implemented in common.

In an embodiment, the operation of the MIMO precoder 340-1 for RF channel 1 and the operation of the MIMO precoder 340-2 for RF channel 2 may be equally performed.

In an embodiment, in response to an operation instruction for the MIMO precoder 340-1 for RF channel 1, the operations of the MIMO precoders 340-1 and 340-2 for RF channel 1 and RF channel 2 may be performed.

In another embodiment, in response to an operation instruction for the MIMO precoder 340-2 for RF channel 2, the operations of the MIMO precoders 340-1 and 340-2 for RF channel 1 and RF channel 2 may be performed.

In an embodiment, when the stream combining units are activated for RF channel 1 and RF channel 2, and the modulation/demodulation order and the code rate for RF channel 1 are different from the modulation/demodulation order and the code rate for RF channel 2, the operation of the stream combining unit for RF channel 1 and the operation of the stream combining unit for RF channel 2 may be differently performed.

In another embodiment, when the stream combining units are activated for RF channel 1 and RF channel 2, and the modulation/demodulation order and the code rate for RF channel 1 are identical to the modulation/demodulation order and the code rate for RF channel 2, the operation of the stream combining unit for RF channel 1 and the operation of the stream combining unit for RF channel 2 may be equally performed.

The outputs of each of the MIMO precoders 340-1 and 340-2 undergo framing & interleaving units 351-1 and 352-1 or 351-2 and 352-2 and waveform generation units 361-1 and 362-1 or 361-2 and 362-2 with respect to respective pieces of data for antenna 1 and antenna 2.

Framing may include configuration of a preamble and configuration of a subframe. Interleaving may include interleaving in a time domain or a frequency domain.

Each of the waveform generation units 361-1, 362-1, 361-2, and 362-2 may include a pilot insertion function, a Multiple-Input Single-Output (MISO) function, an Inverse Fast Fourier Transform (IFFT) function, a Guard Interval (GI) insertion function, and a bootstrap insertion function.

In an embodiment, for the transmission unit corresponding to RF channel 1, an interleaving operation for antenna 1 and an interleaving operation for antenna 2 may be performed using the same parameter. Further, for the transmission unit corresponding to RF channel 2, an interleaving operation for antenna 1 and an interleaving operation for antenna 2 may be performed using the same parameter.

In an embodiment, for the transmission unit corresponding to RF channel 1, a framing operation for antenna 1 and a framing operation for antenna 2 may be performed using the same parameter. Furthermore, for the transmission unit corresponding to RF channel 2, a framing operation for antenna 1 and a framing operation for antenna 2 may be performed using the same parameter.

In an embodiment, the framing operation for antenna 1 of the transmission unit corresponding to RF channel 1 and the framing operation for antenna 1 and the framing operation for antenna 1 of the transmission unit corresponding to RF channel 2 may be performed using different parameters. Also, the framing operation for antenna 2 of the transmission unit corresponding to RF channel 1 and the framing operation for antenna 1 and the framing operation for antenna 2 of the transmission unit corresponding to RF channel 2 may be performed using different parameters.

Signals going through the waveform generation units 361-1 and 362-1 or 361-2, 362-2 may be transmitted through respective antennas.

In an embodiment, for the transmission unit corresponding to RF channel 1, a waveform generation operation for antenna 1 and a waveform generation operation for antenna 2 may be performed using different parameters.

In an embodiment, for the transmission unit corresponding to RF channel 1, a pilot insertion operation for antenna 1 and a pilot insertion operation for antenna 2 may be performed using different parameters.

In an embodiment, for the transmission unit corresponding to RF channel 1, a MISO function operation for antenna 1 and a MISO function operation for antenna 2 may be performed using the same parameter.

In an embodiment, for the transmission unit corresponding to RF channel 1, an IFFT operation for antenna 1 and an IFFT operation for antenna 2 may be performed using the same parameter.

In an embodiment, for the transmission unit corresponding to RF channel 1, a guard interval insertion operation for antenna 1 and a guard interval insertion operation for antenna 2 may be performed using the same parameter.

In an embodiment, for the transmission unit corresponding to RF channel 1, a bootstrap insertion operation for antenna 1 and a bootstrap insertion operation for antenna 2 may be performed using the same parameter.

The framing & interleaving units 351-1 and 352-1 or 351-2 and 352-2 and the waveform generation units 361-1 and 362-1 or 361-2 and 362-2 may be present for antenna 1 and antenna 2, respectively. The framing & interleaving units 351-1 and 352-1 or 351-2 and 352-2 and the waveform generation units 361-1 and 362-1 or 361-2 and 362-2 may be present for RF channel 1 and RF channel 2, respectively.

Figure 4:
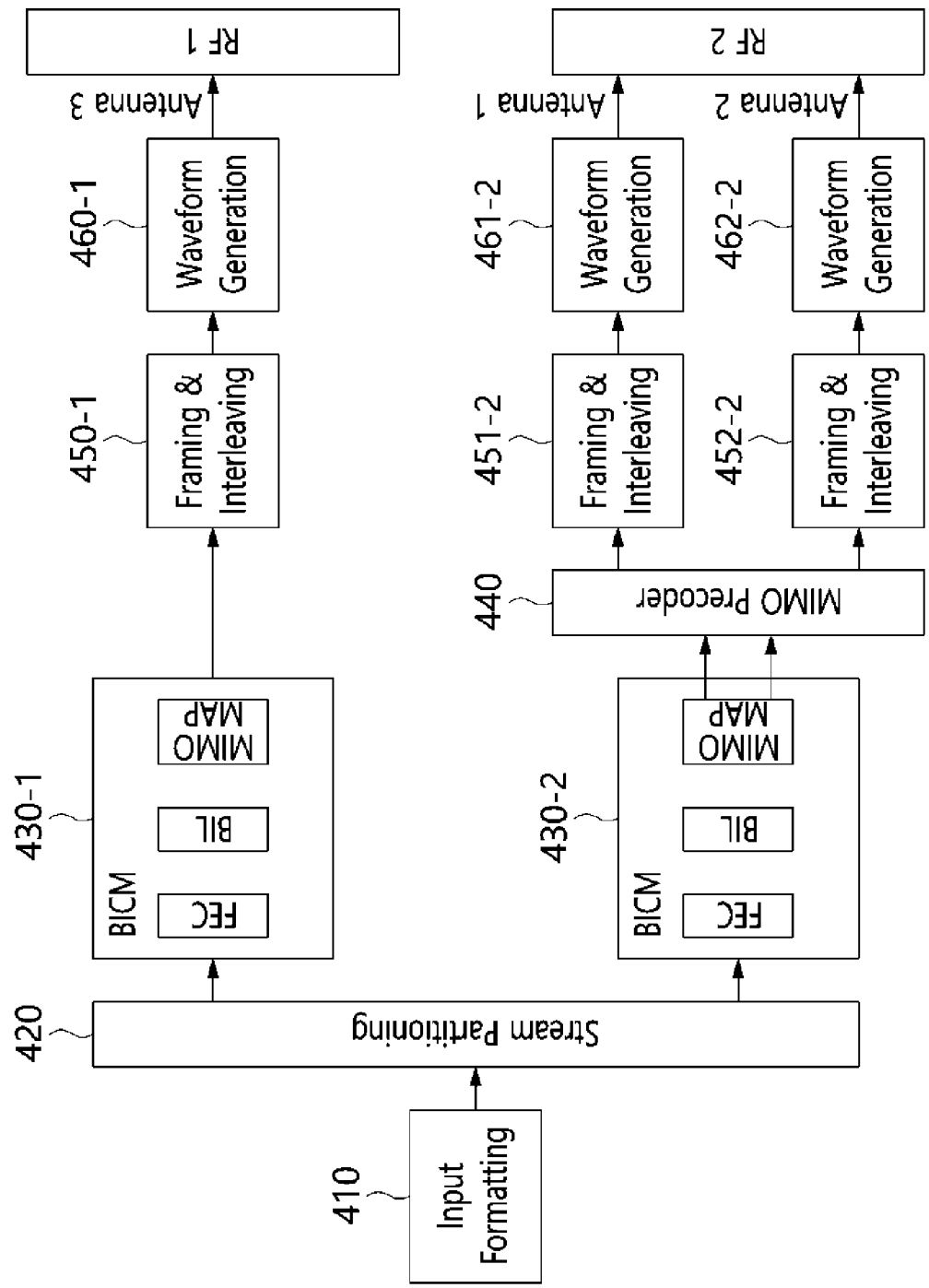
FIG. 4 is a block configuration diagram of an apparatus for channel bonding-based multi-antenna signal transmission in a broadcasting system according to a second embodiment of the present disclosure.

FIG. 4 is a block configuration diagram of an apparatus for channel bonding-based multi-antenna signal transmission in a broadcasting system according to a second embodiment of the present disclosure.

Referring to FIG. 4, data is converted into a physical layer pipe (PLP) through an input formatting unit 420. The converted PLP is input to a stream partitioning unit 420.

The stream partitioning unit 420 may partition the PLP into pieces of data to be transmitted to two or more RF channels, respectively.

In an embodiment, as illustrated in FIG. 4, the stream partitioning unit 420 may function to separate pieces of data to be transmitted to RF channel 1 and to RF channel 2.

Here, the stream partitioning unit 420 may distribute the pieces of data depending on the amounts of data to be transmitted through RF channel 1 and RF channel 2.

In an embodiment, the amounts of data to be distributed by the stream partitioning unit 420 may be predefined depending on the transmission schemes used in RF channel 1 and RF channel 2.

That is, when single-antenna transmission is performed through RF channel 1 and multi-antennal transmission is performed through RF channel 2, the ratio of the amounts of data to be distributed to RF channel 1 and RF channel 2 by the stream partitioning unit 420 may be 1:X.

In an embodiment, X may be 2.

Further, different system parameters may be set for RF channel 1 and RF channel 2. Furthermore, for RF channel 1 and RF channel 2, the same system parameter may be set to have different meanings.

Pieces of data divided into the transmission units for respective RF channels may be individually input to BICM units 430-1 and 430-2. The BICM units 430-1 and 430-2 may be defined differently depending on the transmission schemes used in respective RF channels.

The BICM unit 430-1 included in the first transmission unit of the RF channel through which single-antenna transmission is performed may include a Forward Error Correction (FEC) unit, a Bit Interleaver (BIL), and a mapper.

Here, the FEC unit generates an FEC frame using a baseband packet. The bit interleaver (BIL) performs bit interleaving on the FEC frame generated by the FEC unit. The mapper may include a demultiplexer and a bit-to-In phase and Quadrature (IQ) mapping unit.

The demultiplexer functions to divide a bitstream into data cells. Here, the number of output data cells may vary depending on a modulation/demodulation order.

Constellation mapping is performed on the data cells, generated by the demultiplexer, through the bit-to-IQ mapping unit.

Here, the output of the BICM unit 430-1 for single-antenna transmission may be implemented as a single vector.

The BICM unit 430-2 included in the second transmission unit of the RF channel through which multi-antenna transmission is performed may include a Forward Error Correction (FEC) unit, a Bit Interleaver (BIL), and a Multiple-Input Multiple Output Mapper (MIMO MAP).

Here, the FEC unit generates an FEC frame using a baseband packet. The bit interleaver (BIL) performs bit interleaving on the FEC frame generated by the FEC unit. The MIMO mapper (MIMO MAP) includes a demultiplexer and a bit-to-In phase and Quadrature (IQ) mapping unit.

The demultiplexer functions to divide a bitstream into data cells. Here, the number of output data cells may vary depending on a modulation/demodulation order.

The bit-to-IQ mapping unit performs constellation mapping on the data cells generated by the corresponding demultiplexer. Here, when the index of the corresponding data cell is an even number, the data cell is mapped to transmitting antenna 1, whereas when the index of the corresponding data cell is an odd number, the data cell is mapped to transmitting antenna 2.

The output of the BICM unit 430-2 for multi-antenna transmission may be composed of two or more vectors. Results divided into the data cell for transmitting antenna 1 and the data cell for transmitting antenna 2 are input to a MIMO precoder 440.

The MIMO precoder 440 may include three detailed components such as a stream combining unit, an IQ polarization interleaving unit, and a phase hopping unit.

Respective detailed components of the MIMO precoder 440 may be individually activated/deactivated.

In an embodiment, a framing & interleaving unit 450-1 for RF channel 1 and framing & Interleaving units 451-2 and 452-2 for antenna 1 and antenna 2 of RF channel 2 may be operated using different parameters.

In an embodiment, the framing & interleaving units 451-2 and 452-2 for antenna 1 and antenna 2 of RF channel 2 may be operated using the same parameter.

In an embodiment, the waveform generation unit 460-1 for RF channel 1 and waveform generation units 461-2 and 462-2 for antenna 1 and antenna 2 of RF channel 2 may be operated using different parameters.

In an embodiment, the waveform generation units 461-2 and 462-2 for antenna 1 and antenna 2 of RF channel 2 may be operated using the same parameter.

In an embodiment, the waveform generation units 461-2 and 462-2 for antenna 1 and antenna 2 of RF channel 2 may be operated using different parameters.

Signals going through the waveform generation units 460-1, 461-2, and 462-2, 362-2 may be transmitted through respective antennas.

Single-antenna transmission through RF channel 1 may be performed through antenna 3.

Multi-antenna transmission through RF channel 2 may be performed using antenna 1 and antenna 2.

Here, antenna 3 may be a separate antenna, or an antenna identical to antenna 1 or antenna 2.

The framing & interleaving units 451-2 and 452-2 and the waveform generation units 461-2 and 462-2 may be respectively present for antenna 1 and antenna 2 of RF channel 2.

The framing & interleaving units 450-1, 451-2, and 452-2 and the waveform generation units 460-1, 461-2, and 462-2 may be respectively present for RF channel 1 and RF channel 2.

Figure 5:
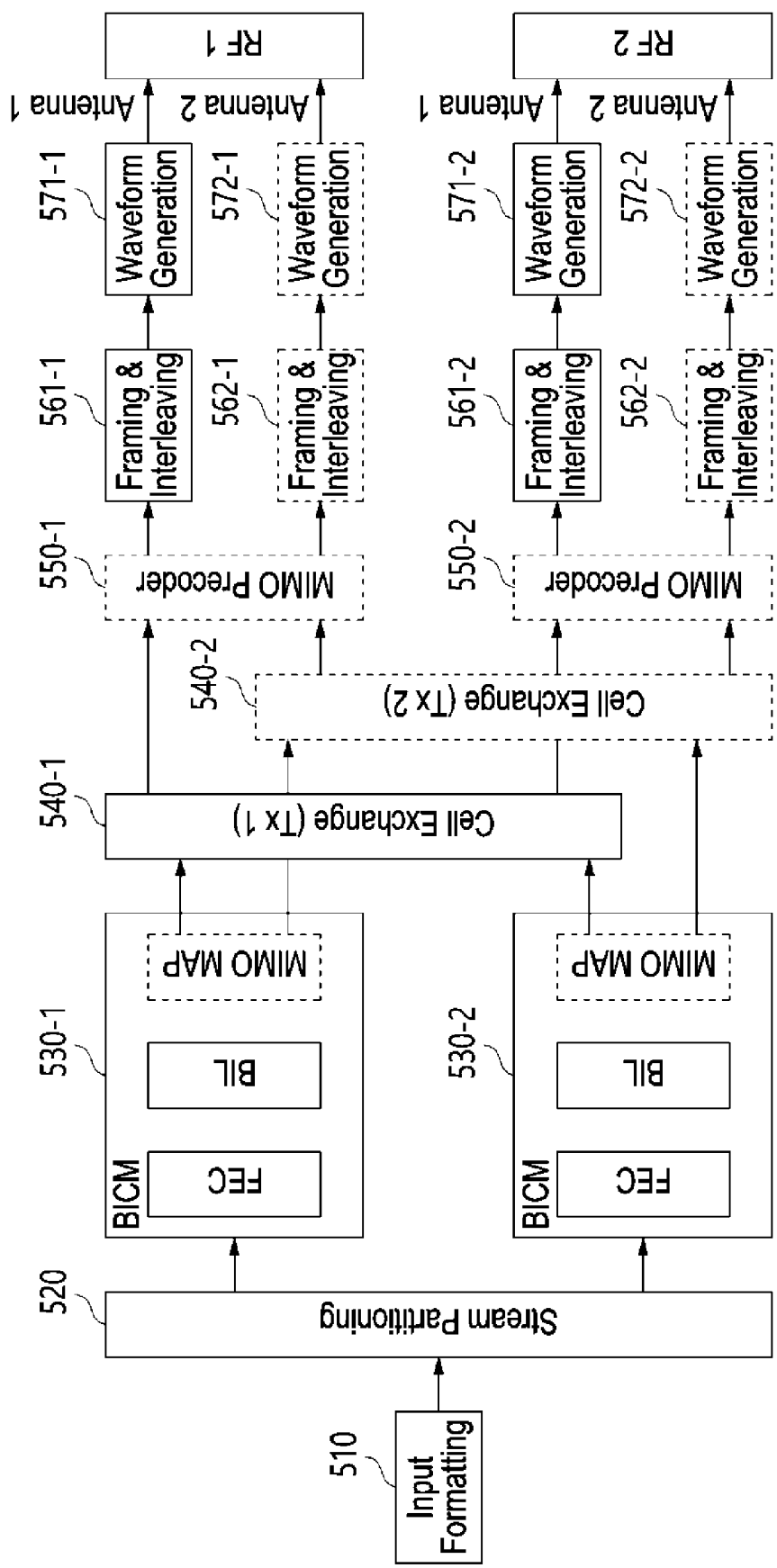
FIG. 5 is a block configuration diagram of an apparatus for channel bonding-based multi-antenna signal transmission in a broadcasting system according to a third embodiment of the present disclosure.

FIG. 5 is a block configuration diagram of an apparatus for channel bonding-based multi-antenna signal transmission in a broadcasting system according to a third embodiment of the present disclosure.

Referring to FIG. 5, data is converted into a physical layer pipe (PLP) through an input formatting unit 510. The converted PLP is input to a stream partitioning unit 520.

The stream partitioning unit 520 may partition the PLP into pieces of data to be transmitted to two or more RF channels, respectively.

In an embodiment, as illustrated in FIG. 3, the stream partitioning unit 520 may function to separate pieces of data to be transmitted to RF channel 1 and to RF channel 2.

The stream partitioning unit 520 may distribute data depending on the amount of data to be transmitted through RF channel 1 and RF channel 2. The pieces of data that are divided and input to respective transmission units for two or more RF channels are individually input to respective BICM units 530-1 and 530-2.

Each of the BICM units 530-1 and 530-2 may be composed of a Forward Error Correction (FEC) unit, a Bit Interleaver (BIL), and a Multiple-Input Multiple Output Mapper (MIMO MAP).

Here, the FEC unit generates an FEC frame using a baseband packet. The bit interleaver (BIL) performs bit interleaving on the FEC frame generated by the FEC unit. The MIMO mapper includes a demultiplexer and a bit-to-In phase and Quadrature (IQ) mapping unit.

The demultiplexer functions to divide a bitstream into data cells. Here, the number of output data cells may vary depending on a modulation/demodulation order. Different modulation/demodulation orders may be assigned to a transmission unit corresponding to RF channel 1 and to a transmission unit corresponding to RF channel 2.

Here, when different modulation/demodulation orders are assigned, the numbers of output data cells of the demultiplexers in the MIMO mappers may be different from each other between RF channel 1 and RF channel 2.

The bit-to-IQ mapping unit performs constellation mapping on the data cells generated by the corresponding demultiplexer. Here, when the index of the corresponding data cell is an even number, the data cell is mapped to transmitting antenna 1, whereas when the index of the corresponding data cell is an odd number, the data cell is mapped to transmitting antenna 2.

Cell exchange units 540-1 and 540-2 may be composed of a first cell exchange (Tx1) unit 540-1 corresponding to transmitting antenna 1 and a second cell exchange (Tx2) unit 540-2 corresponding to transmitting antenna 2.

The first cell exchange (Tx1) unit 540-1 may receive data corresponding to transmitting antenna 1 from the output of the MIMO mapper (MIMO MAP) corresponding to RF channel 1. The first cell exchange (Tx1) unit 540-1 may receive data corresponding to transmitting antenna 1 from the output of the MIMO mapper (MIMO MAP) corresponding to RF channel 2.

The second cell exchange (Tx2) unit 540-2 may receive data corresponding to transmitting antenna 2 from the output of the MIMO mapper (MIMO MAP) corresponding to RF channel 1. The second cell exchange (Tx2) unit 540-2 may receive data corresponding to transmitting antenna 2 from the output of the MIMO mapper (MIMO MAP) corresponding to RF channel 2.

The cell exchange units 540-1 and 540-2 may perform data crossing on the received input data.

Here, data crossing may be performed on a data cell, the index of which is an odd number. That is, data crossing may refer to a process of sending a data cell for RF channel 1 to RF channel 2, and sending a data cell for RF channel 2 to RF channel 1.

The first cell exchange (Tx1) unit 540-1 may exchange the data cell of transmitting antenna 1 corresponding to RF channel 1 with the data cell of transmitting antenna 1 corresponding to RF channel 2.

The second cell exchange (Tx2) unit 540-2 may exchange the data cell of transmitting antenna 2 corresponding to RF channel 1 with the data cell of transmitting antenna 2 corresponding to RF channel 2.

Here, the cell exchange units 540-1 and 540-2 may be activated or deactivated.

The first cell exchange (Tx1) unit 540-1 and the second cell exchange (Tx2) unit 540-2 may be individually activated or deactivated.

The first cell exchange (Tx1) unit 540-1 and the second cell exchange (Tx2) unit 540-2 may be activated or deactivated using individual parameters.

Both the two blocks corresponding to the first cell exchange (Tx1) unit 540-1 and the second cell exchange (Tx2) unit 540-2 may be activated or deactivated.

The first cell exchange (Tx1) unit 540-1 and the second cell exchange (Tx2) unit 540-2 may be activated or deactivated using one parameter.

Pieces of data going through the cell exchange units 540-1 and 540-2 may be respectively input to MIMO precoders 550-1 and 550-2.

A data cell corresponding to RF channel 1, among the outputs of the first cell exchange (Tx1) unit 540-1, and a data cell corresponding to RF channel 1, among the outputs of the second cell exchange (Tx2) unit 540-2, may be input to the MIMO precoder 550-1 corresponding to RF channel 1.

A data cell corresponding to RF channel 2, among the outputs of the first cell exchange (Tx1) unit 540-1, and a data cell corresponding to RF channel 2, among the outputs of the second cell exchange (Tx2) unit 540-2, may be input to the MIMO precoder 550-2 corresponding to RF channel 2.

Each of the MIMO precoders 550-1 and 550-2 may include three detailed components such as a stream combining unit, an IQ polarization interleaving unit, and a phase hopping unit.

Here, the detailed components of each of the MIMO precoders 550-1 and 550-2 may be individually activated or deactivated.

In an embodiment, when the cell exchange units 540-1 and 540-2 are activated, the same configuration may be applied to the MIMO precoders 550-1 and 550-2 for RF channel 1 and RF channel 2.

In an embodiment, when the cell exchange units 540-1 and 540-2 are activated, the MIMO precoder 550-1 for RF channel 1 and the MIMO precoder 550-2 for RF channel 2 may perform the same operation.

In an embodiment, the operation of the MIMO precoder 550-1 for RF channel 1 and the operation of the MIMO precoder 550-2 for RF channel 2 may be implemented in common.

In an embodiment, the operation of the MIMO precoder 550-1 for RF channel 1 and the operation of the MIMO precoder 550-2 for RF channel 2 may be equally performed.

In an embodiment, in response to an operation instruction for the MIMO precoder 550-1 for RF channel 1, the operations of the MIMO precoders 550-1 and 550-2 for RF channel 1 and RF channel 2 may be performed.

In an embodiment, in response to an operation instruction for the MIMO precoder 550-2 for RF channel 2, the operations of the MIMO precoders 550-1 and 550-2 for RF channel 1 and RF channel 2 may be performed.

In an embodiment, activation/deactivation of the stream combining unit for RF channel 1 and activation/deactivation of the stream combining unit for RF channel 2 may be independently performed.

When the stream combining units are activated for RF channel 1 and RF channel 2, and a modulation/demodulation order and a code rate for RF channel 1 are different from a modulation/demodulation order and a code rate for RF channel 2, the operation of the stream combining unit for RF channel 1 and the operation of the stream combining unit for RF channel 2 may be differently performed.

When the stream combining units are activated for RF channel 1 and RF channel 2, and a modulation/demodulation order and a code rate for RF channel 1 are identical to a modulation/demodulation order and a code rate for RF channel 2, the operation of the stream combining unit for RF channel 1 and the operation of the stream combining unit for RF channel 2 may be equally performed.

In an embodiment, when the cell exchange units 540-1 and 540-2 are deactivated, independent configurations may be applied to the MIMO precoders 550-1 and 550-2 for RF channel 1 and RF channel 2.

In an embodiment, the operation of the MIMO precoder 550-1 for RF channel 1 and the operation of the MIMO precoder 550-2 for RF channel 2 may be independently implemented.

In an embodiment, activation/deactivation of the stream combining unit for RF channel 1 and activation/deactivation of the stream combining unit for RF channel 2 may be independently performed.

In an embodiment, the operation of the stream combining unit for RF channel 1 may be determined depending on the modulation/demodulation order and the code rate used for RF channel 1.

In an embodiment, the operation of the stream combining unit for RF channel 2 may be determined depending on the modulation/demodulation order and the code rate used for RF channel 2.

In an embodiment, activation/deactivation of the IQ polarization interleaving unit for RF channel 1 and activation/deactivation of the IQ polarization interleaving unit for RF channel 2 may be independently performed.

In an embodiment, activation/deactivation of the phase hopping unit for RF channel 1 and activation/deactivation of the phase hopping unit for RF channel 2 may be independently performed.

The outputs of each of the MIMO precoders 550-1 and 550-2 undergo framing & interleaving units 561-1 and 562-1 or 561-2 and 562-2 and waveform generation units 571-1 and 572-1 or 571-2 and 572-2 with respect to respective pieces of data for antenna 1 and antenna 2.

Framing may include configuration of a preamble and configuration of a subframe. Interleaving may include interleaving in a time domain or a frequency domain.

Each of the waveform generation units 571-1, 572-1, 571-2, and 572-2 may include a pilot insertion function, a Multiple-Input Single-Output (MISO) function, an Inverse Fast Fourier Transform (IFFT) function, a Guard Interval (GI) insertion function, and a bootstrap insertion function.

In an embodiment, for the transmission unit corresponding to RF channel 1, an interleaving operation for antenna 1 and an interleaving operation for antenna 2 may be performed using the same parameter. Further, for the transmission unit corresponding to RF channel 2, an interleaving operation for antenna 1 and an interleaving operation for antenna 2 may be performed using the same parameter.

In an embodiment, when the cell exchange units 540-1 and 540-2 are activated, a framing operation for antenna 1 and a framing operation for antenna 2 may be performed using the same parameter in relation to a transmission unit corresponding to RF channel 1.

In an embodiment, when the cell exchange units 540-1 and 540-2 are activated, a framing operation for antenna 1 and a framing operation for antenna 2 may be performed using the same parameter in relation to a transmission unit corresponding to RF channel 2.

In an embodiment, when the cell exchange units 540-1 and 540-2 are deactivated, a framing operation for antenna 1 of the transmission unit corresponding to RF channel 1 and a framing operation for antenna 1 of the transmission unit corresponding to RF channel 2 may be performed using different parameters.

In an embodiment, when the cell exchange units 540-1 and 540-2 are deactivated, a framing operation for antenna 2 of the transmission unit corresponding to RF channel 1 and a framing operation for antenna 2 of the transmission unit corresponding to RF channel 2 may be performed using different parameters.

Signals going through the waveform generation units 561-1 and 562-1 or 561-2, 562-2 may be transmitted through respective antennas.

In an embodiment, for the transmission unit corresponding to RF channel 1, a waveform generation operation for antenna 1 and a waveform generation operation for antenna 2 may be performed using different parameters.

In an embodiment, for the transmission unit corresponding to RF channel 1, a pilot insertion operation for antenna 1 and a pilot insertion operation for antenna 2 may be performed using different parameters.

In an embodiment, for the transmission unit corresponding to RF channel 1, a MISO function operation for antenna 1 and a MISO function operation for antenna 2 may be performed using the same parameter.

In an embodiment, for the transmission unit corresponding to RF channel 1, an IFFT operation for antenna 1 and an IFFT operation for antenna 2 may be performed using the same parameter.

In an embodiment, for the transmission unit corresponding to RF channel 1, a guard interval insertion operation for antenna 1 and a guard interval insertion operation for antenna 2 may be performed using the same parameter.

In an embodiment, for the transmission unit corresponding to RF channel 1, a bootstrap insertion operation for antenna 1 and a bootstrap insertion operation for antenna 2 may be performed using the same parameter.

The framing & interleaving units 561-1 and 562-1 or 561-2 and 562-2 and the waveform generation units 571-1 and 572-1 or 571-2 and 572-2 may be present for antenna 1 and antenna 2, respectively. The framing & interleaving units 561-1 and 562-1 or 561-2 and 562-2 and the waveform generation units 571-1 and 572-1 or 571-2 and 572-2 may be present for RF channel 1 and RF channel 2, respectively.

Figure 6:
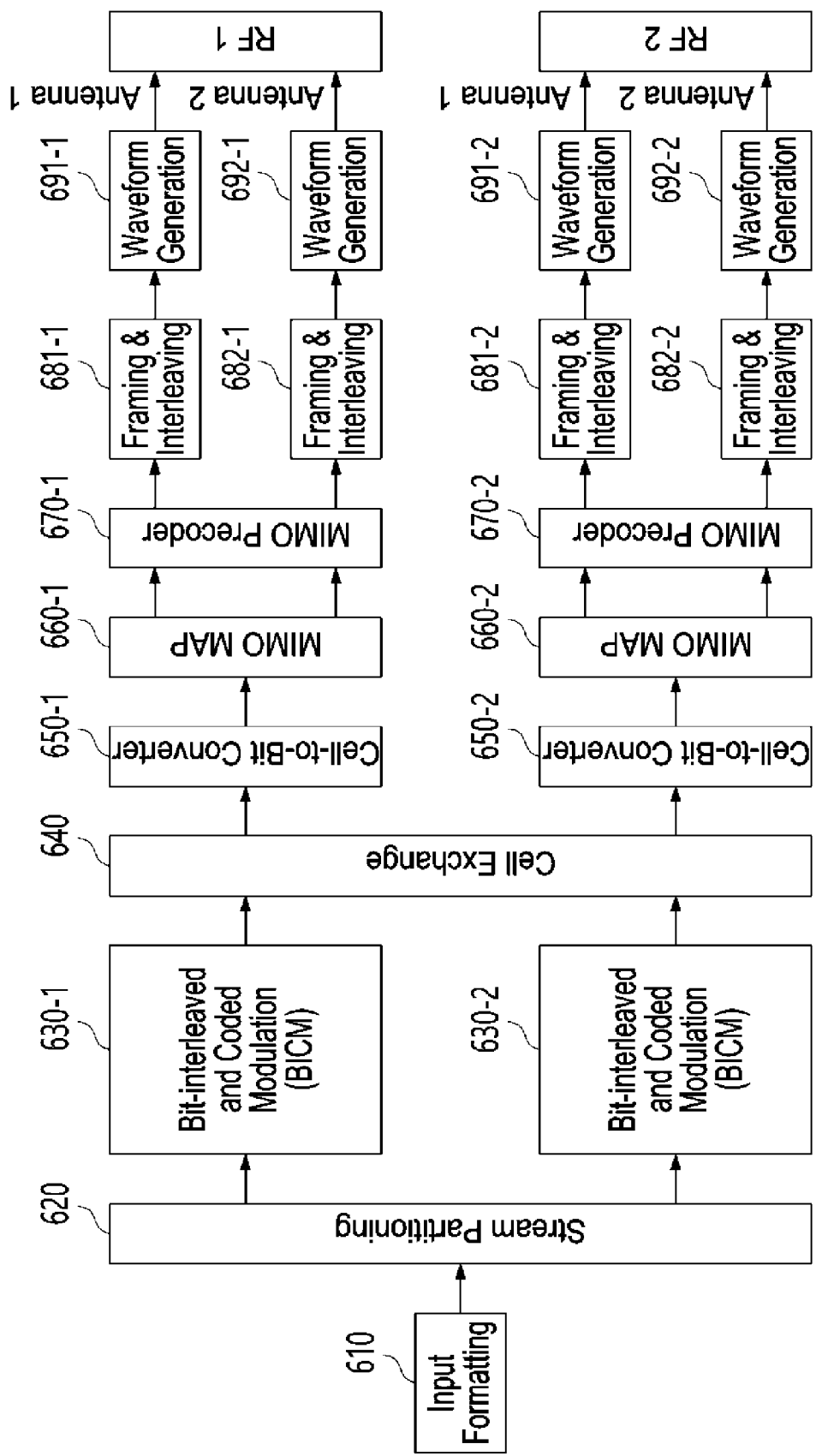
FIG. 6 is a block configuration diagram of an apparatus for channel bonding-based multi-antenna signal transmission in a broadcasting system according to a fourth embodiment of the present disclosure.

FIG. 6 is a block configuration diagram of an apparatus for channel bonding-based multi-antenna signal transmission in a broadcasting system according to a fourth embodiment of the present disclosure.

Referring to FIG. 6, data is converted into a Physical Layer Pipe (PLP) through an input formatting unit 610. The converted PLP is input to a stream partitioning unit 620.

The stream partitioning unit 620 may partition the PLP into pieces of data to be transmitted to two or more RF channels, respectively.

In an embodiment, as illustrated in FIG. 4, the stream partitioning unit 620 may function to separate pieces of data to be transmitted to RF channel 1 and to RF channel 2.

The stream partitioning unit 620 may distribute pieces of data depending on the amounts of data to be transmitted through RF channel 1 and RF channel 2.

In an embodiment, the amounts of data to be distributed by the stream partitioning unit 620 may be predefined depending on the transmission schemes used in RF channel 1 and RF channel 2. Different system parameters may be set for RF channel 1 and RF channel 2. For RF channel 1 and RF channel 2, the same system parameter may be set to have different meanings.

The pieces of data that are divided and input to respective transmission units for two or more RF channels are individually input to respective Bit-interleaved and Coded Modulation (BICM) units 630-1 and 630-2.

Each of the BICM units 630-1 and 630-2 may be composed of a Forward Error Correction (FEC) unit, a Bit Interleaver (BIL) unit, and a mapper.

Here, the FEC unit generates an FEC frame using a baseband packet. The bit interleaver (BIL) performs bit interleaving on the FEC frame generated by the FEC unit. The mapper includes a demultiplexer and a bit-to-In phase and Quadrature (IQ) mapping unit.

The demultiplexer functions to divide a bitstream into data cells. Here, the number of output data cells may vary depending on a modulation/demodulation order.

The bit-to-IQ mapping unit performs constellation mapping on the data cells generated by the corresponding demultiplexer.

Each data cell on which constellation mapping is performed may be input to the cell exchange unit 640.

The cell exchange unit 640 may receive the output of the BICM unit 630-1 corresponding to RF channel 1 and the output of the BICM unit 630-2 corresponding to RF channel 2.

Here, the cell exchange unit 640 may be activated/deactivated depending on a channel bonding mode. When the cell exchange unit 640 is deactivated, the input and output of the cell exchange unit 640 may be identical to each other. When the cell exchange unit 240 is activated, pieces of data of RF channel 1 and RF channel 2 may cross each other depending on the index of each data cell.

In an embodiment, when the index of the corresponding data cell is an even number, the configuration and transmission of a transmission signal using the transmission path of RF channel 1 may be performed on data scheduled to be transmitted through RF channel 1. Similarly, the configuration and transmission of a transmission signal using the transmission path of RF channel 2 may be performed on data scheduled to be transmitted to RF channel 2. For example, the input data and the output data of the cell exchange unit 640 may be identical to each other.

In an embodiment, when the index of the corresponding data cell is an odd number, the configuration and transmission of a transmission signal using the transmission path of RF channel 2 may be performed on data scheduled to be transmitted through RF channel 1. Similarly, the configuration and transmission of a transmission signal using the transmission path of RF channel 1 may be performed on data scheduled to be transmitted to RF channel 2. For example, the RF channel numbers of the input data and the output data of the cell exchange unit 640 may be configured to be changed with each other.

The outputs of the cell exchange unit 640 may be input to respective cell-to-bit converters 650-1 and 650-2 for RF channel 1 and RF channel 2.

The cell-to-bit converters 650-1 and 650-2 may be present for RF channel 1 and RF channel 2, respectively. Each of the cell-to-bit converters 650-1 and 650-2 may perform an operation of converting data, which is converted from a bit into a data cell, back into a bit format through a mapping operation. The operation of the cell-to-bit converters 650-1 and 650-2 may be identical to the inverse operation of constellation mapping by the bit-to-IQ mapping unit in each of the BICM units 630-1 and 630-2.

The pieces of data converted into bit formats through the cell-to-bit converters 650-1 and 650-2 may be input to the MIMO mappers (MAP) 660-1 and 660-2.

The demultiplexer functions to divide a bitstream into data cells. Here, the number of output data cells may vary depending on a modulation/demodulation order. Different modulation/demodulation orders may be assigned to a transmission unit corresponding to RF channel 1 and to a transmission unit corresponding to RF channel 2.

When different modulation/demodulation orders are assigned, the numbers of output data cells of the demultiplexers in the MIMO mappers 660-1 and 660-2 may be different from each other between RF channel 1 and RF channel 2. Constellation mapping is performed on the data cell, generated by each demultiplexer, through the corresponding bit-to-IQ mapping unit. Here, when the index of the corresponding data cell is an even number, the data cell is mapped to transmitting antenna 1, whereas when the index of the corresponding data cell is an odd number, the data cell is mapped to transmitting antenna 2.

Each of MIMO precoders 670-1 and 670-2 includes three detailed components such as a stream combining unit, an IQ polarization interleaving unit, and a phase hopping unit.

Here, the detailed components of each of the MIMO precoders 670-1 and 670-2 may be individually activated or deactivated.

In an embodiment, when the cell exchange unit 640 is activated, the same configuration may be applied to the MIMO precoders 670-1 and 670-2 for RF channel 1 and RF channel 2. In an embodiment, when the cell exchange unit 640 is activated, the MIMO precoder 670-1 for RF channel 1 and the MIMO precoder 670-2 for RF channel 2 may perform the same operation.

In an embodiment, the operation of the MIMO precoder 670-1 for RF channel 1 and the operation of the MIMO precoder 670-2 for RF channel 2 may be implemented in common.

In an embodiment, the operation of the MIMO precoder 670-1 for RF channel 1 and the operation of the MIMO precoder 670-2 for RF channel 2 may be equally performed.

In an embodiment, in response to an operation instruction for the MIMO precoder 670-1 for RF channel 1, the operations of the MIMO precoders 670-1 and 670-2 for RF channel 1 and RF channel 2 may be performed.

In an embodiment, in response to an operation instruction for the MIMO precoder 670-2 for RF channel 2, the operations of the MIMO precoders 670-1 and 670-2 for RF channel 1 and RF channel 2 may be performed.

In an embodiment, activation/deactivation of the stream combining unit for RF channel 1 and activation/deactivation of the stream combining unit for RF channel 2 may be independently performed.

When the stream combining units are activated for RF channel 1 and RF channel 2, and a modulation/demodulation order and a code rate for RF channel 1 are different from a modulation/demodulation order and a code rate for RF channel 2, the operation of the stream combining unit for RF channel 1 and the operation of the stream combining unit for RF channel 2 may be differently performed.

When the stream combining units are activated for RF channel 1 and RF channel 2, and a modulation/demodulation order and a code rate for RF channel 1 are identical to a modulation/demodulation order and a code rate for RF channel 2, the operation of the stream combining unit for RF channel 1 and the operation of the stream combining unit for RF channel 2 may be equally performed.

In an embodiment, when the cell exchange unit 640 is deactivated, independent configurations may be applied to the MIMO precoders 670-1 and 670-2 for RF channel 1 and RF channel 2.

In an embodiment, the operation of the MIMO precoder 670-1 for RF channel 1 and the operation of the MIMO precoder 670-2 for RF channel 2 may be independently implemented.

In an embodiment, activation/deactivation of the stream combining unit for RF channel 1 and activation/deactivation of the stream combining unit for RF channel 2 may be independently performed.

In an embodiment, the operation of the stream combining unit for RF channel 1 may be determined depending on the modulation/demodulation order and the code rate used for RF channel 1. In an embodiment, the operation of the stream combining unit for RF channel 2 may be determined depending on the modulation/demodulation order and the code rate used for RF channel 2.

In an embodiment, activation/deactivation of the IQ polarization interleaving unit for RF channel 1 and activation/deactivation of the IQ polarization interleaving unit for RF channel 2 may be independently performed.

In an embodiment, activation/deactivation of the phase hopping unit for RF channel 1 and activation/deactivation of the phase hopping unit for RF channel 2 may be independently performed.

The outputs of each of the MIMO precoders 670-1 and 670-2 undergo framing & interleaving units 681-1 and 682-1 or 681-2 and 682-2 and waveform generation units 691-1 and 692-1 or 691-2 and 692-2 with respect to respective pieces of data for antenna 1 and antenna 2.

Framing may include configuration of a preamble and configuration of a subframe. Interleaving may include interleaving in a time domain or a frequency domain.

Each of the waveform generation units 691-1, 692-1, 691-2, and 692-2 may include a pilot insertion function, a Multiple-Input Single-Output (MISO) function, an Inverse Fast Fourier Transform (IFFT) function, a Guard Interval (GI) insertion function, and a bootstrap insertion function.

In an embodiment, for the transmission unit corresponding to RF channel 1, an interleaving operation for antenna 1 and an interleaving operation for antenna 2 may be performed using the same parameter. Further, for the transmission unit corresponding to RF channel 2, an interleaving operation for antenna 1 and an interleaving operation for antenna 2 may be performed using the same parameter.

In an embodiment, when the cell exchange unit 640 is activated, a framing operation for antenna 1 and a framing operation for antenna 2 may be performed using the same parameter in relation to a transmission unit corresponding to RF channel 1.

In an embodiment, when the cell exchange unit 640 is activated, a framing operation for antenna 1 and a framing operation for antenna 2 may be performed using the same parameter in relation to a transmission unit corresponding to RF channel 2.

In an embodiment, when the cell exchange unit 640 is deactivated, a framing operation for antenna 1 of the transmission unit corresponding to RF channel 1 and a framing operation for antenna 1 of the transmission unit corresponding to RF channel 2 may be performed using different parameters.

In an embodiment, when the cell exchange unit 640 is deactivated, a framing operation for antenna 2 of the transmission unit corresponding to RF channel 1 and a framing operation for antenna 2 of the transmission unit corresponding to RF channel 2 may be performed using different parameters.

Signals going through the waveform generation units 681-1 and 682-1 or 681-2, 682-2 may be transmitted through respective antennas.

In an embodiment, for the transmission unit corresponding to RF channel 1, a waveform generation operation for antenna 1 and a waveform generation operation for antenna 2 may be performed using different parameters.

In an embodiment, for the transmission unit corresponding to RF channel 1, a pilot insertion operation for antenna 1 and a pilot insertion operation for antenna 2 may be performed using different parameters.

In an embodiment, for the transmission unit corresponding to RF channel 1, a MISO function operation for antenna 1 and a MISO function operation for antenna 2 may be performed using the same parameter.

In an embodiment, for the transmission unit corresponding to RF channel 1, an IFFT operation for antenna 1 and an IFFT operation for antenna 2 may be performed using the same parameter.

In an embodiment, for the transmission unit corresponding to RF channel 1, a guard interval insertion operation for antenna 1 and a guard interval insertion operation for antenna 2 may be performed using the same parameter.

In an embodiment, for the transmission unit corresponding to RF channel 1, a bootstrap insertion operation for antenna 1 and a bootstrap insertion operation for antenna 2 may be performed using the same parameter.

The framing & interleaving units 681-1 and 682-1 or 681-2 and 682-2 and the waveform generation units 691-1 and 692-1 or 691-2 and 692-2 may be present for antenna 1 and antenna 2, respectively. The framing & interleaving units 681-1 and 682-1 or 681-2 and 682-2 and the waveform generation units 691-1 and 692-1 or 691-2 and 692-2 may be present for RF channel 1 and RF channel 2, respectively.

Figure 7:
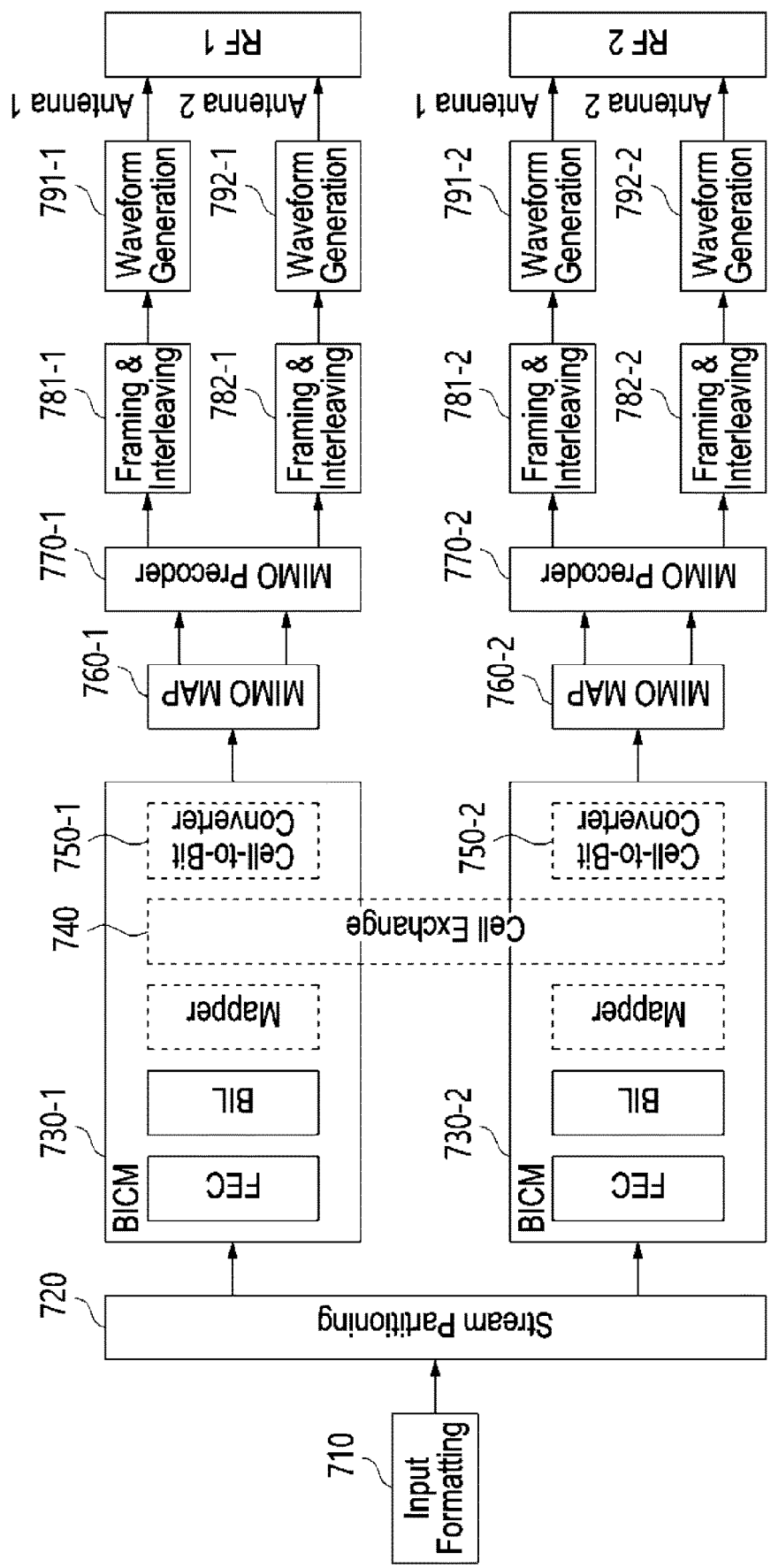
FIG. 7 is a block configuration diagram of an apparatus for channel bonding-based multi-antenna signal transmission in a broadcasting system according to a fifth embodiment of the present disclosure.

FIG. 7 is a block configuration diagram of an apparatus for channel bonding-based multi-antenna signal transmission in a broadcasting system according to a fifth embodiment of the present disclosure.

Referring to FIG. 7, data is converted into a Physical Layer Pipe (PLP) through an input formatting unit 710. The converted PLP is input to a stream partitioning unit 720.

The stream partitioning unit 720 may partition the PLP into pieces of data to be transmitted to two or more RF channels, respectively.

In an embodiment, as illustrated in FIG. 4, the stream partitioning unit 720 may function to separate pieces of data to be transmitted to RF channel 1 and to RF channel 2.

The stream partitioning unit 720 may distribute pieces of data depending on the amounts of data to be transmitted through RF channel 1 and RF channel 2.

In an embodiment, the amounts of data to be distributed by the stream partitioning unit 720 may be predefined depending on the transmission schemes used in RF channel 1 and RF channel 2. Different system parameters may be set for RF channel 1 and RF channel 2. For RF channel 1 and RF channel 2, the same system parameter may be set to have different meanings.

The pieces of data that are divided and input to respective transmission units for two or more RF channels are individually input to respective Bit-interleaved and Coded Modulation (BICM) units 730-1 and 730-2.

Each of the BICM units 730-1 and 730-2 may be composed of a Forward Error Correction (FEC) unit, a Bit Interleaver (BIL) unit, and a mapper.

Here, the FEC unit generates an FEC frame using a baseband packet. The bit interleaver (BIL) performs bit interleaving on the FEC frame generated by the FEC unit. The mapper includes a demultiplexer and a bit-to-In phase and Quadrature (IQ) mapping unit.

The demultiplexer functions to divide a bitstream into data cells. Here, the number of output data cells may vary depending on a modulation/demodulation order.

The bit-to-IQ mapping unit performs constellation mapping on the data cells generated by the corresponding demultiplexer.

Each data cell on which constellation mapping is performed may be input to the cell exchange unit 740.

The cell exchange unit 740 may receive the output of the mapper corresponding to RF channel 1 and the output of the mapper corresponding to RF channel 2.

Here, the cell exchange unit 740 may be activated/deactivated depending on a channel bonding mode. When the cell exchange unit 740 is deactivated, the input and output of the cell exchange unit 740 may be identical to each other. When the cell exchange unit 240 is activated, pieces of data of RF channel 1 and RF channel 2 may cross each other depending on the index of each data cell.

In an embodiment, when the index of the corresponding data cell is an even number, the configuration and transmission of a transmission signal using the transmission path of RF channel 1 are performed on data scheduled to be transmitted through RF channel 1. Similarly, the configuration and transmission of a transmission signal using the transmission path of RF channel 2 may be performed on data scheduled to be transmitted to RF channel 2. For example, the input data and the output data of the cell exchange unit 740 may be identical to each other.

In an embodiment, when the index of the corresponding data cell is an odd number, the configuration and transmission of a transmission signal using the transmission path of RF channel 2 may be performed on data scheduled to be transmitted through RF channel 1. Similarly, the configuration and transmission of a transmission signal using the transmission path of RF channel 1 may be performed on data scheduled to be transmitted to RF channel 2. For example, the RF channel numbers of the input data and the output data of the cell exchange unit 740 may be configured to be changed with each other.

The outputs of the cell exchange unit 740 may be input to respective cell-to-bit converters 750-1 and 750-2 for RF channel 1 and RF channel 2.

The cell-to-bit converters 750-1 and 750-2 may be present for RF channel 1 and RF channel 2, respectively. Each of the cell-to-bit converters 750-1 and 750-2 may perform an operation of converting data, which is converted from a bit into a data cell, back into a bit format through a mapping operation. The operation of the cell-to-bit converters 750-1 and 750-2 may be identical to the inverse operation of constellation mapping by the bit-to-IQ mapping unit in each of the BICM units 730-1 and 730-2.

The pieces of data converted into bit formats through the cell-to-bit converters 750-1 and 750-2 may be input to the MIMO mappers (MAP) 760-1 and 760-2.

Each of the MIMO mappers 760-1 and 760-2 may include a demultiplexer and a bit-to-In phase and Quadrature (IQ) mapping unit.

The demultiplexer functions to divide a bitstream into data cells. Here, the number of output data cells may vary depending on a modulation/demodulation order. Different modulation/demodulation orders may be assigned to a transmission unit corresponding to RF channel 1 and to a transmission unit corresponding to RF channel 2.

When different modulation/demodulation orders are assigned, the numbers of output data cells of the demultiplexers in the MIMO mappers 760-1 and 760-2 may be different from each other between RF channel 1 and RF channel 2. Constellation mapping may be performed on the data cell, generated by each demultiplexer, through the corresponding bit-to-IQ mapping unit. Here, when the index of the corresponding data cell is an even number, the data cell is mapped to transmitting antenna 1, whereas when the index of the corresponding data cell is an odd number, the data cell is mapped to transmitting antenna 2.

Each of MIMO precoders 770-1 and 770-2 includes three detailed components such as a stream combining unit, an IQ polarization interleaving unit, and a phase hopping unit.

Here, the detailed components of each of the MIMO precoders 770-1 and 770-2 may be individually activated or deactivated.

In an embodiment, when the cell exchange unit 740 is activated, the same configuration may be applied to the MIMO precoders 770-1 and 770-2 for RF channel 1 and RF channel 2. In an embodiment, when the cell exchange unit 740 is activated, the MIMO precoder 770-1 for RF channel 1 and the MIMO precoder 770-2 for RF channel 2 may perform the same operation.

In an embodiment, the operation of the MIMO precoder 770-1 for RF channel 1 and the operation of the MIMO precoder 770-2 for RF channel 2 may be implemented in common.

In an embodiment, the operation of the MIMO precoder 770-1 for RF channel 1 and the operation of the MIMO precoder 770-2 for RF channel 2 may be equally performed.

In an embodiment, in response to an operation instruction for the MIMO precoder 770-1 for RF channel 1, the operations of the MIMO precoders 770-1 and 770-2 for RF channel 1 and RF channel 2 may be performed.

In an embodiment, in response to an operation instruction for the MIMO precoder 770-2 for RF channel 2, the operations of the MIMO precoders 770-1 and 770-2 for RF channel 1 and RF channel 2 may be performed.

In an embodiment, activation/deactivation of the stream combining unit for RF channel 1 and activation/deactivation of the stream combining unit for RF channel 2 may be independently performed.

When the stream combining units may be activated for RF channel 1 and RF channel 2, and a modulation/demodulation order and a code rate for RF channel 1 are different from a modulation/demodulation order and a code rate for RF channel 2, the operation of the stream combining unit for RF channel 1 and the operation of the stream combining unit for RF channel 2 may be differently performed.

When the stream combining units are activated for RF channel 1 and RF channel 2, and a modulation/demodulation order and a code rate for RF channel 1 are identical to a modulation/demodulation order and a code rate for RF channel 2, the operation of the stream combining unit for RF channel 1 and the operation of the stream combining unit for RF channel 2 may be equally performed.

In an embodiment, when the cell exchange unit 740 is deactivated, independent configurations may be applied to the MIMO precoders 770-1 and 770-2 for RF channel 1 and RF channel 2.

In an embodiment, the operation of the MIMO precoder 770-1 for RF channel 1 and the operation of the MIMO precoder 770-2 for RF channel 2 may be independently implemented.

In an embodiment, activation/deactivation of the stream combining unit for RF channel 1 and activation/deactivation of the stream combining unit for RF channel 2 may be independently performed.

In an embodiment, the operation of the stream combining unit for RF channel 1 may be determined depending on the modulation/demodulation order and the code rate used for RF channel 1. In an embodiment, the operation of the stream combining unit for RF channel 2 may be determined depending on the modulation/demodulation order and the code rate used for RF channel 2.

In an embodiment, activation/deactivation of the IQ polarization interleaving unit for RF channel 1 and activation/deactivation of the IQ polarization interleaving unit for RF channel 2 may be independently performed.

In an embodiment, activation/deactivation of the phase hopping unit for RF channel 1 and activation/deactivation of the phase hopping unit for RF channel 2 may be independently performed.

The outputs of each of the MIMO precoders 770-1 and 770-2 undergo framing & interleaving units 781-1 and 782-1 or 781-2 and 782-2 and waveform generation units 791-1 and 792-1 or 791-2 and 792-2 with respect to respective pieces of data for antenna 1 and antenna 2.

Framing may include configuration of a preamble and configuration of a subframe. Interleaving may include interleaving in a time domain or a frequency domain.

Each of the waveform generation units 791-1, 792-1, 791-2, and 792-2 may include a pilot insertion function, a Multiple-Input Single-Output (MISO) function, an Inverse Fast Fourier Transform (IFFT) function, a Guard Interval (GI) insertion function, and a bootstrap insertion function.

In an embodiment, for the transmission unit corresponding to RF channel 1, an interleaving operation for antenna 1 and an interleaving operation for antenna 2 may be performed using the same parameter. Further, for the transmission unit corresponding to RF channel 2, an interleaving operation for antenna 1 and an interleaving operation for antenna 2 may be performed using the same parameter.

In an embodiment, when the cell exchange unit 740 is activated, a framing operation for antenna 1 and a framing operation for antenna 2 may be performed using the same parameter in relation to a transmission unit corresponding to RF channel 1.

In an embodiment, when the cell exchange unit 740 is activated, a framing operation for antenna 1 and a framing operation for antenna 2 may be performed using the same parameter in relation to a transmission unit corresponding to RF channel 2.

In an embodiment, when the cell exchange unit 740 is deactivated, a framing operation for antenna 1 of the transmission unit corresponding to RF channel 1 and a framing operation for antenna 1 of the transmission unit corresponding to RF channel 2 may be performed using different parameters.

In an embodiment, when the cell exchange unit 740 is deactivated, a framing operation for antenna 2 of the transmission unit corresponding to RF channel 1 and a framing operation for antenna 2 of the transmission unit corresponding to RF channel 2 may be performed using different parameters.

Signals going through the waveform generation units 781-1 and 782-1 or 781-2, 782-2 may be transmitted through respective antennas.

In an embodiment, for the transmission unit corresponding to RF channel 1, a waveform generation operation for antenna 1 and a waveform generation operation for antenna 2 may be performed using different parameters.

In an embodiment, for the transmission unit corresponding to RF channel 1, a pilot insertion operation for antenna 1 and a pilot insertion operation for antenna 2 may be performed using different parameters.

In an embodiment, for the transmission unit corresponding to RF channel 1, a MISO function operation for antenna 1 and a MISO function operation for antenna 2 may be performed using the same parameter.

In an embodiment, for the transmission unit corresponding to RF channel 1, an IFFT operation for antenna 1 and an IFFT operation for antenna 2 may be performed using the same parameter.

In an embodiment, for the transmission unit corresponding to RF channel 1, a guard interval insertion operation for antenna 1 and a guard interval insertion operation for antenna 2 may be performed using the same parameter.

In an embodiment, for the transmission unit corresponding to RF channel 1, a bootstrap insertion operation for antenna 1 and a bootstrap insertion operation for antenna 2 may be performed using the same parameter.

The framing & interleaving units 781-1 and 782-1 or 781-2 and 782-2 and the waveform generation units 791-1 and 792-1 or 791-2 and 792-2 may be present for antenna 1 and antenna 2, respectively. The framing & interleaving units 781-1 and 782-1 or 781-2 and 782-2 and the waveform generation units 791-1 and 792-1 or 791-2 and 792-2 may be present for RF channel 1 and RF channel 2, respectively.

Figure 8:
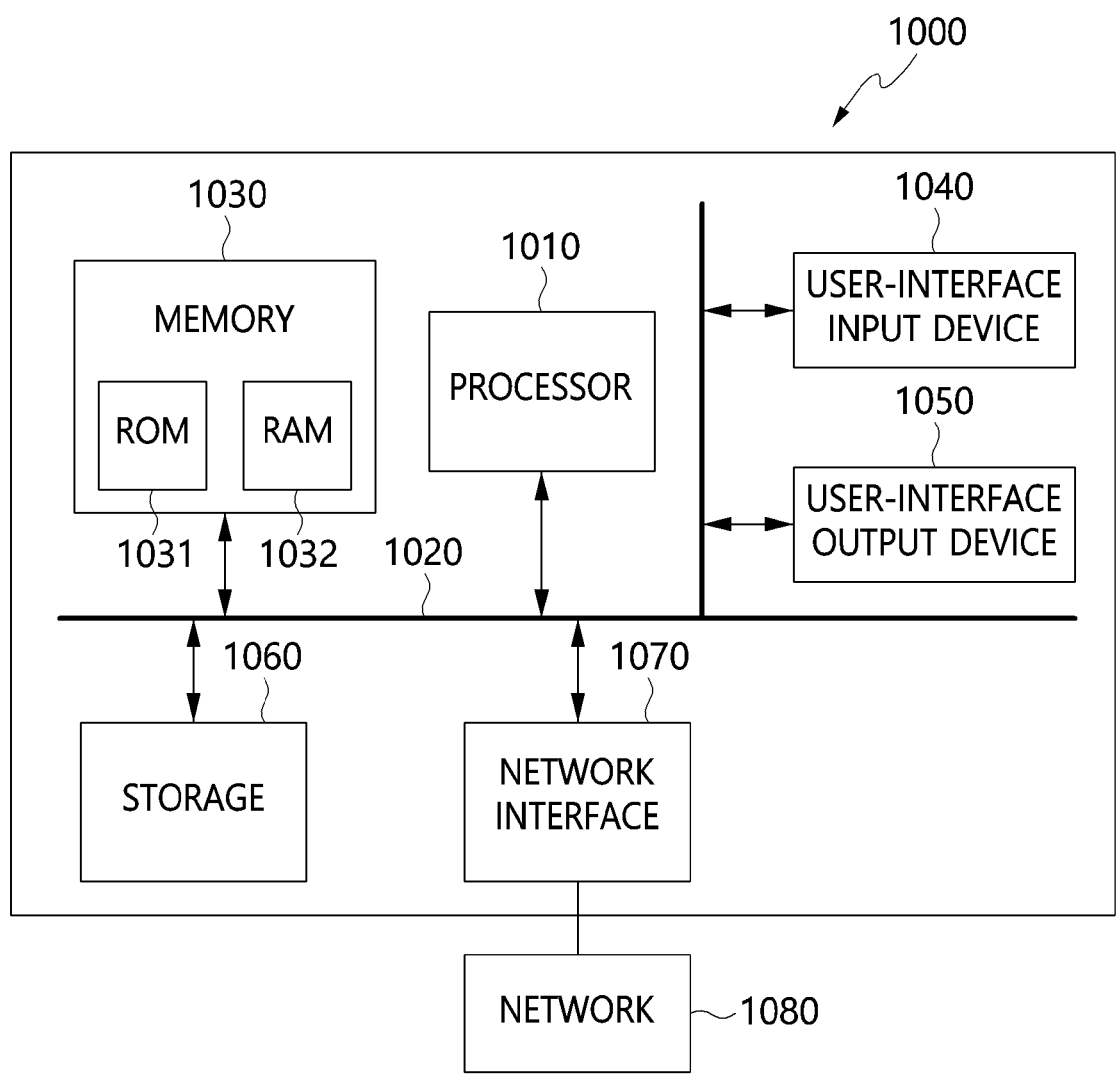
FIG. 8 is a diagram illustrating the configuration of a computer system according to an embodiment.

FIG. 8 is a diagram illustrating the configuration of a computer system according to an embodiment.

An apparatus for channel bonding-based multi-antenna signal transmission in a broadcasting system according to an embodiment may be implemented as a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium, or a combination thereof. For example, the memory 1030 may include Read-Only Memory (ROM) 1031 or Random Access Memory (RAM) 1032.

The above-described apparatus for channel bonding-based multi-antenna signal transmission in a broadcasting system may perform a method for channel bonding-based multi-antenna signal transmission in the broadcasting system according to an embodiment.

A method for channel bonding-based multi-antenna signal transmission in a broadcasting system according to an embodiment may include the input formatting step of converting input data into a Physical Layer Pipe (PLP), the stream partitioning step of partitioning the PLP into pieces of data to be transmitted through two or more channels, respectively, and the step of transmission units for transmitting the pieces of data resulting from partitioning to corresponding channels through one or more antennas.

Here, the transmitting step may include the steps of dividing the pieces of data resulting from partitioning into data cells to be transmitted through two or more transmitting antennas, performing MIMO precoding on each of the data cells, performing framing and interleaving operations respectively corresponding to the two or more transmitting antennas, and generating waveforms to be transmitted, wherein the transmitting step is performed for each of two or more channels.

Here, the transmitting step may include, for a first channel, the steps of dividing the pieces of data resulting from partitioning into data cells to be transmitted through two or more transmitting antennas, respectively, performing MIMO precoding on each of the data cells, performing framing and interleaving operations respectively corresponding to the two or more transmitting antennas, and generating waveforms to be transmitted, and the transmitting step may include, for a second channel, the steps of dividing the pieces of data resulting from partitioning into data cells to be transmitted through a single-transmitting antenna, performing a framing and interleaving operation corresponding to the single-transmitting antenna, and generating a waveform to be transmitted.

The method for channel bonding-based multi-antenna signal transmission in the broadcasting system according to another embodiment may include an input formatting step of converting input data into a Physical Layer Pipe (PLP), a stream-partitioning step of partitioning the PLP into pieces of data to be transmitted to two or more channels, respectively, and the step of transmitting the pieces of data resulting from the partitioning to the corresponding channels through multiple antennas, wherein the transmitting step may include the step of crossing pieces of data to be transmitted to respective channels between the channels and transmitting the crossed data.

Here, the transmission step may include the step of dividing the pieces of data resulting from the partitioning into data cells to be transmitted through multiple antennas, the step of crossing data cells corresponding to N-th transmitting antennas for respective channels between the channels, the step of performing MIMO precoding on the crossed data cells, the step of performing framing and interleaving corresponding to each of multiple antennas, and the step of generating waveforms to be transmitted, wherein the crossing step may be performed multiple times for the sequence number of each transmitting antenna.

Here, the partitioning step may include the step of generating an FEC frame using a baseband packet, the step of performing bit interleaving on the generated FEC frame, and the step of dividing bit-interleaved data into data cells to be transmitted through multiple antennas.

Here, the transmitting step may include the step of performing Bit-Interleaved and Coded Modulation (BICM) on the pieces of data resulting from the partitioning, the step of crossing pieces of data output from BICM units of transmission units between channels and outputting the pieces of crossed data, the step of converting the pieces of crossed data for respective channels into bits, the step of dividing the converted bit data into data cells to be transmitted through multiple antennas, the step of performing MIMO precoding on the data cells, the step of performing framing and interleaving operations respectively corresponding to two or more transmitting antennas, and the step of generating waveforms to be transmitted.

Here, the step of performing the bit-interleaved and coded modulation may include the step of generating an FEC frame using a baseband packet, the step of performing bit interleaving on the generated FEC frame, and the step of dividing an interleaved bitstream into data cells and performing constellation mapping on the generated data cells.

Here, when the cell exchange units are activated, the MIMO precoding step may be equally operated for respective channels, whereas when the cell exchange units are deactivated, the MIMO precoding step may be operated independently for respective channels.

Here, the framing and interleaving step may include the step of, when the cell exchange units are activated, performing the framing operation on multiple antennas corresponding to each channel using the same parameter for the corresponding channel, and when the cell exchange units are deactivated, performing framing operations on N-th antennas corresponding to respective channels using different parameters.

According to the embodiments, there can be provided a transmission scheme that supports both channel bonding technology and multi-antenna transmission technology so as to maximize the transfer rate of a terrestrial broadcasting system.

According to the embodiments, there can be provided a transmission scheme that supports both cross channel bonding technology and multi-antenna transmission technology so as to maximize the transfer rate of a terrestrial broadcasting system.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. An apparatus for channel bonding-based multi-antenna signal transmission comprising a processor and a memory, the memory storing instructions executable by the processor to implement the following:
   an input formatting unit for converting input data into a Physical Layer Pipe (PLP);
   a stream partitioning unit for partitioning the PLP into pieces of data to be transmitted to two or more channels, respectively; and
   two or more transmission units for transmitting the pieces of data resulting from partitioning to corresponding channels through multiple transmitting antennas;
   wherein each of the transmission units comprises:
   a Bit-Interleaved and Coded Modulation (BICM) unit for dividing the pieces of data resulting from partitioning into data cells to be transmitted through multiple transmitting antennas, respectively, and outputting the data cells;
   N cell exchange units for crossing pieces of data that correspond to N-th transmitting antennas and are output from respective BICM units between channels, and outputting pieces of crossed data to respective MIMO precoders;
   a Multiple-Input Multiple-Output (MIMO) precoder for performing stream combining, In phase and Quadrature (IQ) polarization interleaving, and phase hopping on each of the data cells and outputting results thereof; and
   framing and interleaving units and waveform generation units respectively corresponding to the multiple transmitting antennas.

2. The apparatus of claim 1, wherein the BICM unit comprises:
   a Forward Error Correction (FEC) for generating an FEC frame using a baseband packet;
   a Bit Interleaver (BIL) for performing bit interleaving on the generated FEC frame; and
   a MIMO mapper for dividing bit-interleaved data into data cells to be transmitted through respective multiple transmitting antennas,
   wherein the MIMO mapper comprises:
   a demultiplexer for dividing a bitstream into data cells; and
   a bit-to-In phase and Quadrature (IQ) mapping unit for performing constellation mapping on each data cell generated by the demultiplexer, and
   wherein the Bit-to-IQ mapping unit is configured to, when an index of the corresponding data cell is an even number, map the data cell to a first transmitting antenna, and when an index of the data cell is an odd number, map the data cell to a second transmitting antenna.

3. The apparatus of claim 1, wherein the MIMO precoder comprises a stream combining unit, an IQ polarization interleaving unit, and a phase hopping unit, which are individually activated or deactivated.

4. The apparatus of claim 1, wherein the cell exchange units are individually activated or deactivated using different parameters, or are collectively activated or deactivated using an identical parameter.

5. The apparatus of claim 4, wherein each of the MIMO precoders comprises:
a stream combining unit, an IQ polarization interleaving unit, and a phase hopping unit, which are configured to, when the cell exchange units are activated, be operated equally for respective channels, and when the cell exchange units are deactivated, be operated independently for respective channels.

6. The apparatus of claim 4, wherein the framing and interleaving units and the waveform generation units are configured to:
when the cell exchange units are activated, perform framing operations for multiple transmitting antennas corresponding to each channel by using an identical parameter for a corresponding channel, and
when the cell exchange units are deactivated, perform framing operations for N-th transmitting antennas corresponding to respective channels by using different parameters.

7. An apparatus for channel bonding-based multi-antenna signal transmission comprising a processor and a memory, the memory storing instructions executable by the processor to implement the following:
an input formatting unit for converting input data into a Physical Layer Pipe (PLP);
a stream partitioning unit for partitioning the PLP into pieces of data to be transmitted to two or more channels, respectively; and
two or more transmission units for transmitting the pieces of data resulting from partitioning to corresponding channels through multiple transmitting antennas,
wherein each of the transmission units comprises:
a BICM unit for performing bit-interleaved and code modulation on the pieces of data resulting from partitioning and outputting results thereof;
a MIMO mapper for dividing pieces of bit data resulting from partitioning into data cells to be transmitted through multiple transmitting antennas, respectively, and outputting the data cells;
a Multiple-Input Multiple-Output (MIMO) precoder for performing stream combining, IQ polarization interleaving, and phase hopping on each of the data cells resulting from partitioning and outputting results thereof; and
framing and interleaving units and waveform generation units respectively corresponding to the multiple transmitting antennas, and
wherein the apparatus further comprises:
a cell exchange unit for crossing and outputting pieces of data output from the BICM units of the transmission units between channels;
cell-to-bit converters for converting pieces of data for respective channels output from the cell exchange unit into bits and outputting the bits to corresponding MIMO precoders.

8. The apparatus of claim 7, wherein the cell exchange unit is activated or deactivated depending on a channel-bonding mode, and is configured to, when the cell exchange unit is activated, cross the pieces of data between the channels depending on whether an index of each data cell is an odd number or an even number.

9. The apparatus of claim 8, wherein the MIMO precoder comprises:
a stream combining unit, an IQ polarization interleaving unit, and a phase hopping unit, which are configured to, when the cell exchange unit is activated, be operated equally for respective channels, and when the cell exchange unit is deactivated, be operated independently for respective channels.

10. The apparatus of claim 8, wherein the framing and interleaving units and the waveform generation units are configured to:
when the cell exchange unit is activated, perform framing operations for multiple transmitting antennas corresponding to each channel by using an identical parameter for the corresponding channel, and
when the cell exchange unit is deactivated, perform framing operations for N-th transmitting antennas corresponding to respective channels by using different parameters.

11. A method for channel bonding-based multi-antenna signal transmission in a broadcasting system, comprising:
an input formatting operation of converting input data into a Physical Layer Pipe (PLP);
a stream partitioning operation of partitioning the PLP into pieces of data to be transmitted through two or more channels, respectively; and
a transmitting operation for transmitting the pieces of data resulting from partitioning to corresponding channels through one or more transmitting antennas,
wherein the transmitting operation comprises:
dividing the pieces of data resulting from partitioning into data cells to be transmitted through multiple transmitting antennas, respectively;
crossing data cells corresponding to N-th transmitting antennas for respective channels between channels;
performing MIMO precoding on each of the crossed data cells;
performing framing and interleaving operations respectively corresponding to the multiple transmitting antennas; and
generating waveforms to be transmitted,
wherein the crossing is performed multiple times for respective sequence numbers of the transmitting antennas.

12. The method of claim 11,
wherein the transmitting operation is performed for each of two or more channels.

13. The method of claim 11, wherein the transmitting operation comprises, for a first channel:
dividing the pieces of data resulting from partitioning into data cells to be transmitted through two or more transmitting antennas, respectively;
performing MIMO precoding on each of the data cells;
performing framing and interleaving operations respectively corresponding to the two or more transmitting antennas; and
generating waveforms to be transmitted, and wherein the transmitting operation comprises, for a second channel:
dividing the pieces of data resulting from partitioning into data cells to be transmitted through a single-transmitting antenna;
performing a framing and interleaving operation corresponding to the single-transmitting antenna; and
generating a waveform to be transmitted.

14. The method of claim 12, wherein the transmitting operation further comprises:
crossing the pieces of data to be transmitted to respective channels between channels.

* * * * *